United States Patent
Flynn et al.

(10) Patent No.: US 10,375,620 B2
(45) Date of Patent: Aug. 6, 2019

(54) DETERMINING ROUTING OF PROXY TRAFFIC BETWEEN MOBILE CLIENT AND PROXY DEVICES

(71) Applicant: APPLE INC., Cupertino, CA (US)

(72) Inventors: Paul V. Flynn, Palo Alto, CA (US); Wen Zhao, Cupertino, CA (US); Syed Aon Mujtaba, Cupertino, CA (US); Sriram Hariharan, San Jose, CA (US); Matthew L. Semersky, San Jose, CA (US)

(73) Assignee: APPLE INC., Cupertino, CA (US)

( * ) Notice: Subject to any disclaimer, the term of this patent is extended or adjusted under 35 U.S.C. 154(b) by 103 days.

(21) Appl. No.: 14/921,490

(22) Filed: Oct. 23, 2015

(65) Prior Publication Data
US 2016/0262082 A1    Sep. 8, 2016

Related U.S. Application Data

(60) Provisional application No. 62/129,492, filed on Mar. 6, 2015.

(51) Int. Cl.
*H04W 4/80* (2018.01)
*H04W 52/02* (2009.01)
(Continued)

(52) U.S. Cl.
CPC ............ *H04W 40/22* (2013.01); *H04L 67/28* (2013.01); *H04M 19/04* (2013.01); *H04W 4/18* (2013.01);
(Continued)

(58) Field of Classification Search
CPC ... H04W 36/18; H04W 48/18; H04W 76/023; H04W 12/06; H04W 88/04; H04W 88/10;
(Continued)

(56) References Cited

U.S. PATENT DOCUMENTS 8,606,266 B1   12/2013  Mitchell
2007/0140199 A1*  6/2007  Zhao ................. H04W 52/0229
                                                  370/338
(Continued)

FOREIGN PATENT DOCUMENTS

WO    WO 2016095992 A1 *  6/2016 ............ H04W 28/02

OTHER PUBLICATIONS

International Search Report and Written Opinion dated Mar. 31, 2016 in PCT/US2015/0067054 11 pages.

*Primary Examiner* — Un C Cho
*Assistant Examiner* — Peter K Mak
(74) *Attorney, Agent, or Firm* — Kilpatrick Townsend & Stockton LLP

(57) ABSTRACT

A host device may include a first wireless communication circuit, a second wireless communication circuit including a proxy router, and a host processor communicatively coupled to the wireless communication circuits. The host device may receive, via the second wireless communication circuit, an advertisement message from a client device. The advertisement message may include a request for communication of data with a network. The host device may determine at least one of a communication policy preference of the host device and a network connection property of the host device. The proxy router may select the first or the second wireless communication circuit for use by the host device to communicate the data with the network. The host device may provide, via the second wireless communication circuit, a connection request to the client device, and then transfer, using the selected wireless communication circuit, the data between the client device and the network.

12 Claims, 14 Drawing Sheets

(51) Int. Cl.
*H04M 19/04* (2006.01)
*H04W 48/18* (2009.01)
*H04W 4/18* (2009.01)
*H04L 29/08* (2006.01)
*H04W 76/14* (2018.01)
*H04W 88/04* (2009.01)
*H04W 40/22* (2009.01)
*H04W 88/18* (2009.01)
*H04W 8/18* (2009.01)
*H04W 76/16* (2018.01)

(52) U.S. Cl.
CPC .............. *H04W 4/80* (2018.02); *H04W 48/18* (2013.01); *H04W 52/028* (2013.01); *H04W 8/18* (2013.01); *H04W 76/14* (2018.02); *H04W 76/16* (2018.02); *H04W 88/04* (2013.01); *H04W 88/182* (2013.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/22* (2018.01); *Y02D 70/23* (2018.01); *Y02D 70/26* (2018.01)

(58) Field of Classification Search
CPC ..... H04W 36/14; H04W 4/206; H04W 8/005; H04L 67/125; H04L 67/306; H04L 12/2816; H04L 65/80; H04L 51/32; H04L 65/403; H04M 1/72583; G06Q 50/01
See application file for complete search history.

(56) References Cited

U.S. PATENT DOCUMENTS

| | | | |
|---|---|---|---|
| 2009/0215404 A1* | 8/2009 | Kesavan | H04W 48/18 455/73 |
| 2010/0304738 A1* | 12/2010 | Lim | H04W 36/30 455/426.1 |
| 2011/0309921 A1* | 12/2011 | Tachibana | H04B 7/14 340/425.1 |
| 2012/0020341 A1* | 1/2012 | Moeller | H04W 88/16 370/338 |
| 2012/0165006 A1* | 6/2012 | Ge | H04W 88/04 455/423 |
| 2012/0173901 A1 | 7/2012 | Soliman et al. | |
| 2012/0214527 A1 | 8/2012 | Meylan et al. | |
| 2012/0258759 A1* | 10/2012 | Smadi | H04W 52/52 455/522 |
| 2012/0315905 A1* | 12/2012 | Zhu | H04W 36/36 455/436 |
| 2013/0163464 A1* | 6/2013 | Lau | H04L 43/16 370/253 |
| 2014/0071816 A1* | 3/2014 | Ye | H04W 36/14 370/229 |
| 2014/0199963 A1* | 7/2014 | Mohebbi | H04W 40/02 455/410 |
| 2014/0269614 A1* | 9/2014 | Maguire | H04W 4/80 370/331 |
| 2014/0344062 A1* | 11/2014 | Lamont | G06Q 30/0267 705/14.64 |
| 2014/0362807 A1* | 12/2014 | Bhatnagar | H04W 4/00 370/329 |
| 2015/0031367 A1* | 1/2015 | Singh | H04W 36/08 455/437 |
| 2015/0081906 A1* | 3/2015 | Backholm | H04W 74/06 709/225 |
| 2015/0085650 A1* | 3/2015 | Cui | H04W 92/02 370/230 |
| 2015/0085659 A1* | 3/2015 | Hong | H04W 76/023 370/235 |
| 2015/0173000 A1* | 6/2015 | Basilier | H04W 48/18 370/329 |
| 2015/0282088 A1* | 10/2015 | Weizman | H04W 52/0245 455/41.2 |

* cited by examiner

DETERMINING ROUTING OF PROXY TRAFFIC BETWEEN MOBILE CLIENT AND PROXY DEVICES

CROSS-REFERENCES TO RELATED APPLICATIONS

The present application claims priority from and is a nonprovisional application of U.S. Provisional Application No. 62/129,492, entitled "Determining Routing of Proxy Traffic Between Mobile Client And Proxy Devices" filed Mar. 6, 2015, the entire contents of which are herein incorporated by reference for all purposes. This application is related to the following commonly owned U.S. patent applications: U.S. Provisional Patent Application No. 62/056,297, filed Sep. 26, 2014, entitled "Network Bandwidth Sharing For Mobile Devices;" U.S. Provisional Patent Application No. 62/129,476, filed Mar. 6, 2015, entitled "Determining When To Establish Connection Between Mobile Client And Proxy Devices;" and U.S. Provisional Application No. 62/129,643, filed Mar. 6, 2015, entitled "Cloud Support For Discovery And Data Transfer Between Mobile Client and Proxy Devices," which are herein incorporated by reference in their entirety for all purposes.

FIELD

Embodiments relate generally to managing proxy network connections between devices.

BACKGROUND

With the ever expanding number of different types of networked devices, users may now simultaneously utilize several computing devices including a desktop computer, a laptop computer, a mobile phone, a tablet, networked wearable devices, networked home appliances, and other networked devices. Smaller mobile devices in particular may not have the power or hardware resources for network connectivity to much of the existing wireless network infrastructure. Additionally, by their very nature, wearable devices are often moving while being worn by users that are active. Managing communications in such an environment is an increasingly complex task.

SUMMARY

Systems, methods, and computer-readable medium for optimizing the flow of traffic through a proxy device to a mobile client device are provided. In some embodiments, the mobile client device may have limited wireless network capabilities, such as a smart watch or the like, while the proxy device may have wide area network (e.g., the Internet) access.

According to some embodiments, the host device may comprise a first wireless communication circuit, a second wireless communication circuit that includes a proxy router, and a host processor communicatively coupled to the first and second wireless communication circuits. The host device may receive, from the client device, via the second wireless communication circuit, an advertisement message that includes a request to communicate data with the wide area network. The host device may then determine at least one of a communication policy preference of the host device and a network connection property of the host device.

A network connection property the host device may be determined based on current network connectivity available to the host device. The communication policy preference may indicate a preference for a WiFi connection over a cellular data connection when a WiFi connection is available at the host device. The proxy router may select the first wireless communication circuit or the second wireless communication circuit for use by the host device to communicate the data with the network. The selection may be based on a policy preference or a network connection property of the host device. The host device may provide, via the second wireless communication circuit, a connection request to the client device. The host device may establish a connection with the client device, and transfer, using the selected wireless communication circuit, the data between the client device and the network. The selection of the wireless communication circuit may be based on a policy preference of the host device or a network connection property of the host device. The transfer of data may be managed by the proxy router to allow the host processor to remain in a low power state.

According to other embodiments, a client device may be able to achieve Internet access via connecting to a host device with Internet access. The client device may identify a connection type needed by the client device in response to receipt of a trigger signal indicating that an attempt to connect to the host device is to be performed. The client device may also generate an advertisement message for requesting connection to the host device. The advertisement message may be provided to the host device with a request for a wireless connection with the host device. The advertisement message may include an indication of a requested connection type. The client device may receive a connection request from the host device that that identifies a network connection property of the host device for accessing the network.

Other embodiments are directed to systems, portable consumer devices, and computer readable media associated with methods described herein.

A better understanding of the nature and advantages of embodiments of the present disclosure may be gained with reference to the following detailed description and the accompanying drawings.

DETAILED DESCRIPTION

Figure 1:
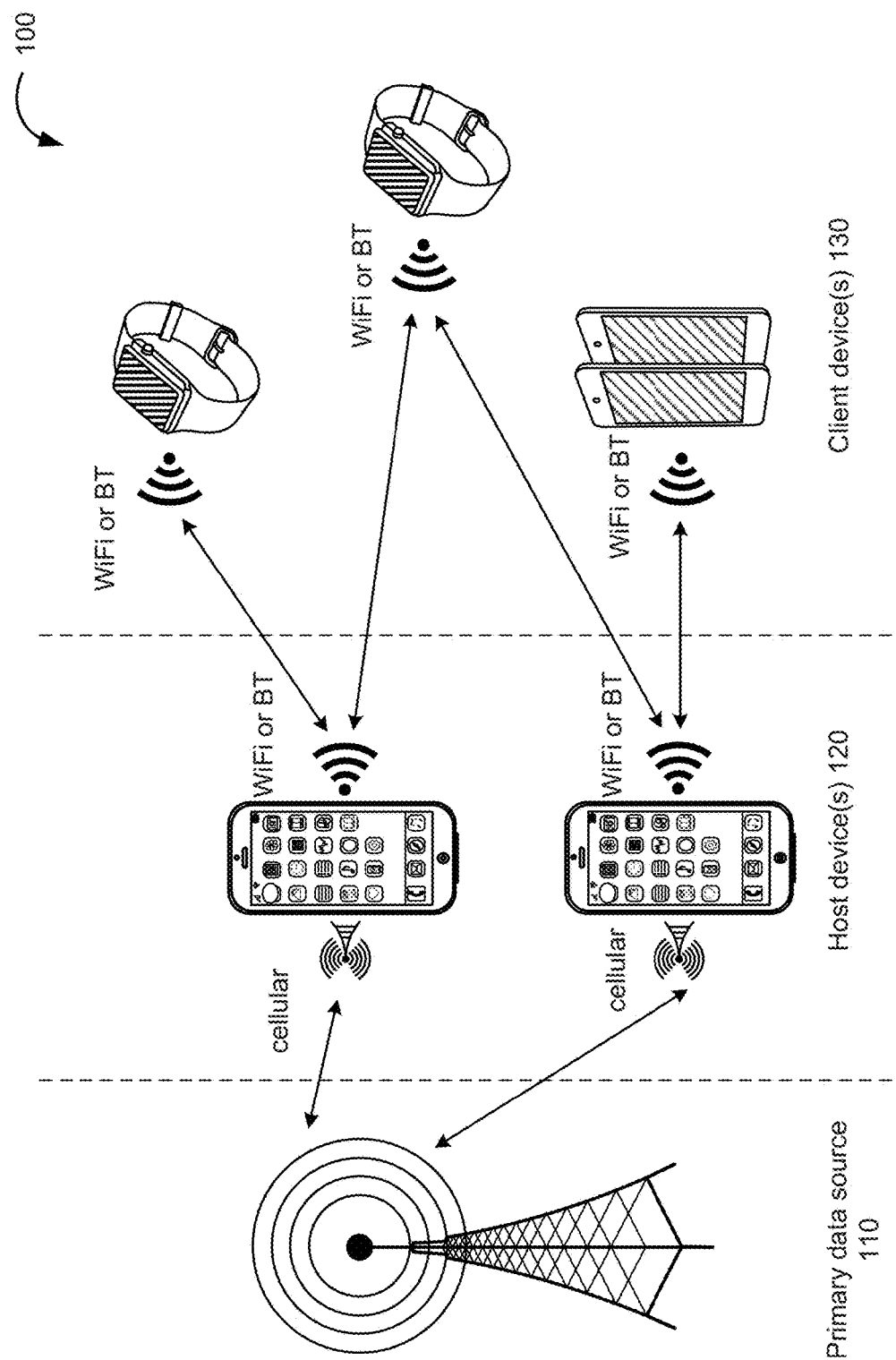
FIG. 1 is an example block diagram of a system showing communication between a primary data source, host device, and client devices.

Embodiments described herein relate to the use of a host device (e.g., a smartphone) to provide wide area network (WAN) service (e.g., cellular data service) to an electronic device, such as a smart watch and a music player, with limited or no WAN connectivity. The connectivity process can include determinations of what type of connection is needed, how to route a connection, and with which components of the host device to create a connection. Such determinations can reduce power consumption by the host device and reduce frustration of a user.

Certain types of electronic devices often do not have cellular data service, or other WAN service, that operates effectively or seamlessly as a user moves from location to location. In many cases, this is due to size and/or power restrictions on such devices. The antennas for such services are larger than the antennas for local area network (LAN) or near field connections provided by WiFi, Bluetooth™ (BT), or other such short-range communication systems. The additional costs and size of WAN network chipsets and WAN service providers also can discourage inclusion of this functionality in some electronic devices. Rather than integrating such functionality with certain types of electronic devices, e.g., small devices, embodiments can use LAN functionality of a connectivity-limited electronic device to enable communication via a host device with WAN access.

Host devices that include WAN functionality and client devices that include LAN functionality may both be configured to identify their own network connection properties (if any). Additionally, a host device may be configured to identify its communication policy preferences based on predetermined or user-selected preferences for communicating data between the host device and a WAN. The communication policy preferences may indicate that WiFi communications are preferred over cellular when the connection properties indicate that a WiFi connection is available.

The host device may have a communication circuit that includes a proxy router. The proxy router within the host device's communication circuit may be configured to select a route for data connections between a client device and the WAN based on one or more policy preferences of the host device and one or more network connection properties of the host device. Handling the routing within the communication circuit can reduce power consumption by an application processor of the host device, and address privacy concerns when the client device is of a different user than the host device.

Accordingly, a route of a data connection between the client and the WAN may be selected by the proxy router of the host device based on a policy preference of the host device or a network connection property of the host device.

I. Devices for Utilizing a Proxy

A client device refers devices that receive the benefit of network bandwidth shared by a host device. Examples of such devices include smart watches, music players such as iPod™ devices, LAN-only health monitors, and other such devices with LAN functionality.

A host device, a proxy device, or a data provider all refer to any device with both WAN and LAN functionality that may be configured to provide network access to a client device that may not be associated with a user of the host device. Smartphones are one example of such a host device. Mobile access points (AP) with WAN and LAN functionality, laptop computers, or other such devices may also function as host devices.

In some examples, a user may utilize at least two electronic devices. One of the two electronic devices may be a client device, while the other may be a host device as defined above. For example, the user may utilize a wearable device and a smartphone, or other WAN-accessible device. While the user's smartphone may regularly act as the host device for the client device to access WAN content, there may be instances where the user is only interacting with the client device and/or is out of range of the host device. In such instances, the client device may attempt to access WAN content via one or more other host devices, e.g., of other users. One such example may include while the user is exercising. In this case, the user may choose to interact with the wearable device due to its smaller size, and may opt to leave the host device behind. As such, if the client device can access WAN content through another host device, it may not have to rely on the user's host device. Other examples may include instances where the battery of the user's host device has degraded or has at least lowered to a level where access to the WAN via the user's host device may not be feasible. In these examples where the user of the client device is relying on another user's host device, the user may want to minimize the power consumption resulting from accessing WAN content through the host device. For example, the user of the client device may wish to avoid accessing WAN content through an application processor of the host device so as to reduce battery usage at the host device.

A. Systems

FIG. 1 illustrates a system than can implement proxy network connection management to provide network access to moving client devices without WAN functionality. FIG. 1 includes a primary data source 110, two host devices 120, and three client devices 130. The primary data source 110 may be any data source connected to a WAN such as the Internet. Such primary data sources may include cell phone towers, satellites, high altitude balloons with network functionality, and other such network infrastructure. The primary data source 110 communicates directly with each host device 120 via a WAN connection, such as wireless long-term evolution (LTE) cellular communications.

If a host device 120 is configured to share network resources with client devices 130, then the host device 120 and client device 130 will communicate via a wireless LAN (WLAN) connection such as WiFi or Bluetooth™ (BT). The WLAN connection may be initiated by either the host device 120 or the client device 130 in different embodiments. In certain embodiments, a client device 130 may send an advertisement message to a host device 120 (also called a "proxy device") requesting a WLAN connection, and the host device may select a route for the WLAN connection based on one or more factors (including a communication policy preference or a network connection property) associated with the host device 120. An appropriate route may, for example, be selected when a network connection property indicates a WiFi connection to the WLAN is available and when a communication policy preference indicates that data is to be communicated through a WiFi network when possible. Such selection or determination of an appropriate route may be managed by a proxy router of the host device 120. In some embodiments, data transfer using the selected route may be managed by the proxy router to allow a host processor to remain in a low power state. For example, the proxy router of the host device may bypass an application processor of the host device and route data through one or more communication circuits of the host device to minimize battery usage by the application processor.

B. Proximity of Devices

Figure 2:
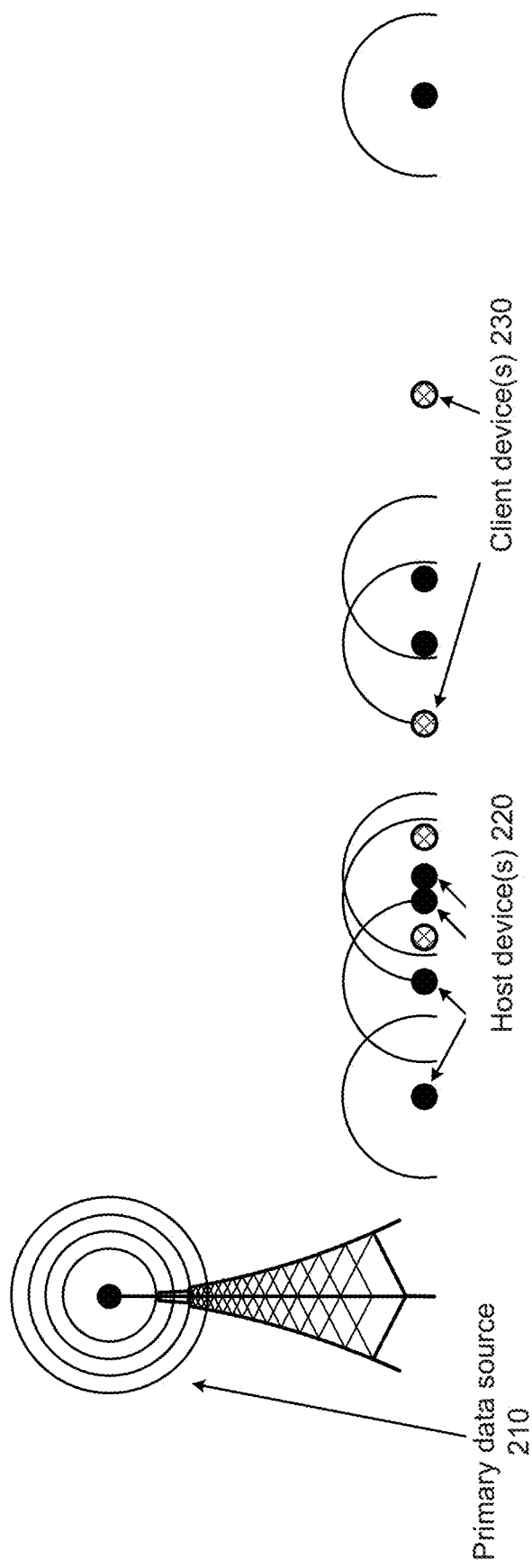
FIG. 2 is an example block diagram illustrating host devices and client devices at various locations.

FIG. 2 is an example block diagram illustrating host devices and client devices at various locations. FIG. 2 similarly shows a primary data source 210, with a number of host devices 220, and client devices 230, where the horizontal axis conveys distance. Each host device 220 is shown with service arcs indicating the effective communication distance for WLAN communications. In many environments, the devices will be on flat ground, so the service is essentially offered in a circle around the host device 220, but inside a building or in other environments, data may also be shared by a host device 220 to client devices 230 above or below a sharing host device 220. As illustrated by FIG. 2, with a sufficient number and density of appropriate host devices 220, regular periodic service, near-continuous, or even continuous service may be offered to client devices 230, even when the client devices 230 are moving in and out of range of connected host devices 220. In some cases, the client devices 230 and the host devices 220 may be moving towards each other or away from each other. In some implementations, such devices may not be a good choice for establishing LAN connections, particularly when a more suitable host is available. A host device 220 with WLAN access may be able to connect to a client device 230 with limited wireless networking capabilities to provide the WLAN access to the client device 230. In this way, the host device 220 can act as a proxy device.

II. Communications Between Devices

The network connection management can be done without having to explicitly set up another device on the host device. Normally, one would need to allow tethering explicitly on a user interface and specify a particular device to gain network access. In some examples, a user can specify only some general parameters, and not have to allow access on a device-by-device basis. Since acting as a host device may cause battery drain on the proxy device, and may use data from a cellular data plan of a user of the proxy device (which may be different from the user of the client device), each proxy device can decide whether to volunteer to serve as a host. Additionally, once a potential host volunteers, each client device can decide whether to accept the proxy connection. This section describes inter-device communications and metrics that may be used to facilitate the network connection management (i.e., these decisions) according to embodiments described herein.

Figure 3:
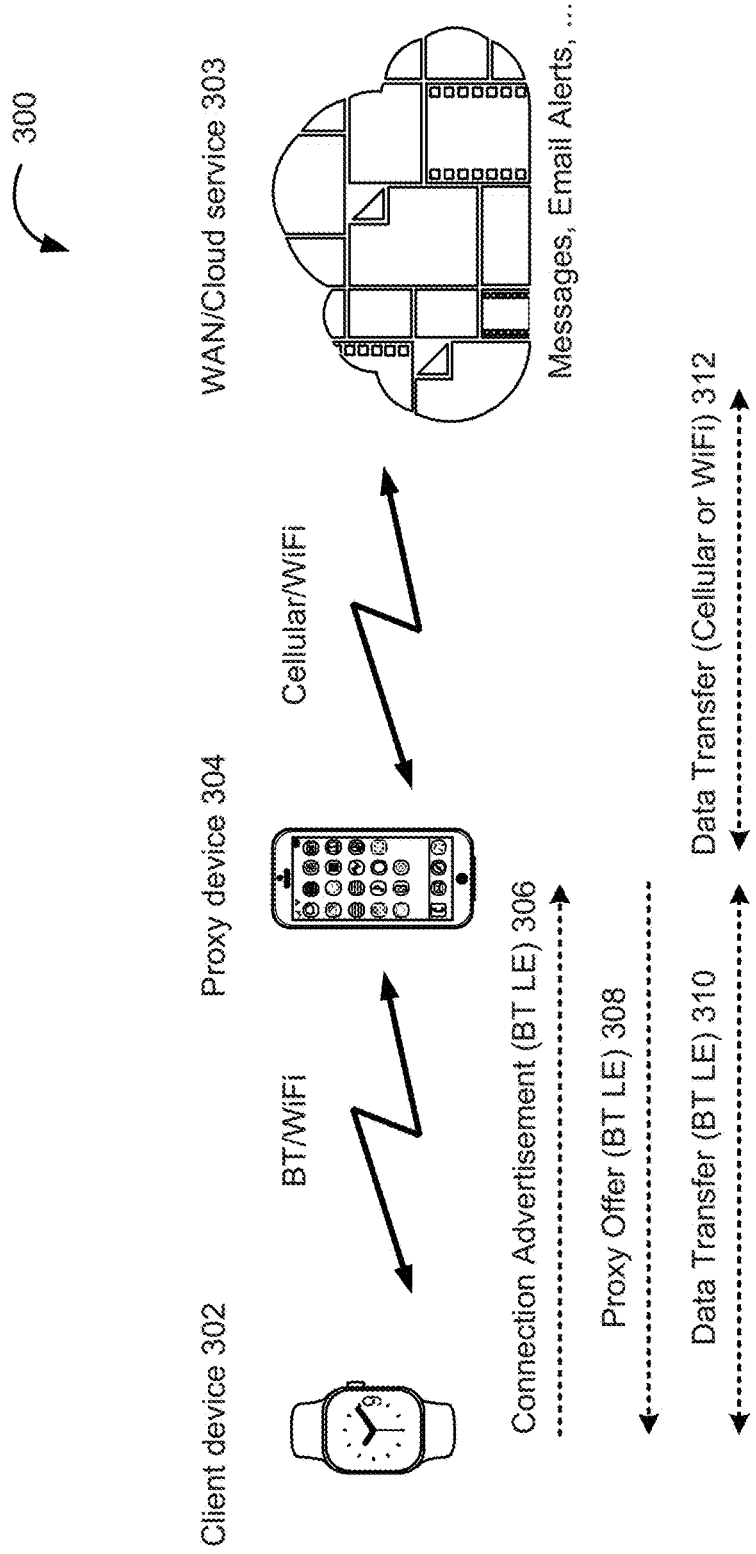
FIG. 3 is an example block diagram showing embodiments of the communication between a host device and a client device.

FIG. 3 is a block diagram of a system 300 according to various embodiments. FIG. 3 and other figures are merely illustrative of an embodiment or implementation, or of aspects of an embodiment or implementation disclosed herein, and should not limit the scope of any embodiment as recited in the claims. One of ordinary skill in the art may recognize through this disclosure and the teachings presented herein other variations, modifications, and/or alternatives to those embodiments or implementations illustrated in the figures. FIG. 3 is one example of a system that may use a host device to provide data to client devices. The devices in system 300 can include hardware and/or software elements.

A. Connection Advertisements

FIG. 3 illustrates signaling between a client device 302, a proxy device 304, and a cloud service 303 to which proxy device 304 can connect. Client device 302 may be in motion at the time the client device 302 requests a network connection (e.g., while being worn on a user exercising or otherwise moving). As such, the client device 302 may send out connection requests regularly (e.g., periodically or the like), as any current connection may be only temporary while client device 302 is within range of a host device to which a connection is made. Especially since host devices may also be in motion, connections with host devices may be brief for a client device.

In one aspect, the client device 302 may request a WAN connection from a proxy device 304 by providing a connection advertisement 306. Generally, connection advertisements 306 can be any type of request for a connection and may not be directed to any particular proxy devices 304. The connection advertisement 306 may include a type of connection being requested, an identifier of the client device 302 (e.g., a device identification (ID) or the like), a payload, and/or a priority level of the request. The type of the connection being requested may identify whether the client device 302 has data to be uploaded to a server through the WAN (e.g., via an uplink connection) or whether the client device 302 is checking for data to be downloaded from a server through the WAN (e.g., via a downlink connection). That is, an advertisement message 306 sent from client device 302 may be a request for WAN connection that includes an indication of a requested connection type (e.g., uplink or downlink). For example, the advertisement message 306 may be an advertisement for uplink data upon demand sent to proxy device 304. Also, for example, the advertisement message 306 may be an advertisement for downlink data (e.g., a request that the host device check for downlink data). When the client device 302 has data to be uploaded, the payload may include that data; however, in some examples, when there is data to be downloaded, the connection advertisement 306 will not include data in the payload.

The connection advertisements 306 may be prompted by a triggering event, such as a periodic or contextual signal indicating that the client device 302 can connect to the Internet or other WAN or it may be signaled by an indication that a previous connection with a host device has terminated, e.g., because of separation. The periodic or contextual signal may originate from the client device 302. For example, the client device 302 may be configured to request a WAN connection periodically (e.g., every minute, every hour, etc.) to check for data to be downloaded or to upload data that was collected (e.g., by sensors) or received (e.g., from the user) by the client device 302. Additionally, the triggering event might occur when the user requests data from the Internet or provides data to be backed-up via the client device 302. As noted, the triggering event might occur when the client device 302 identifies that it is no longer connected to a previously connected proxy device 304.

B. Proxy Device

Proxy devices, such as the proxy device 304 of FIG. 3, may be configured to host WAN access (e.g., the Internet) for a client device 302. For example, a client device 302 may provide a connection advertisement, requesting such WAN access from the proxy device 304. The advertisement from the client device 302 may include an indication of a requested connection type (e.g., uplink or downlink). For example, the client device 302 can send an advertisement for uplink data upon demand (e.g., to the proxy device). Also, for example, the client device 302 can send an advertisement for downlink data according to a telescoping metric (e.g., a request that the proxy device check for downlink data). Additionally, the advertisement may also include network connection properties such as a received signal strength indication (RSSI), and/or signal-to-noise ratio (SNR) information, effectively indicating (or using a congestion control algorithm (CCA) to detect) the strength of the potential communication between the client device 302 and the proxy device 304. In other words, in this context, the RSSI and the SNR may be an indication of how well the proxy device 304 will be able to host. For example, if the RSSI is low, the ability of the proxy device 304 to host the WAN connection for the client device 302 will be limited even if the WAN connection of the proxy device 304 is excellent. In some examples, RSSI information may be replaced with Reference Signal Receive Power (RSRP) information.

C. Routing Traffic

In some embodiments, a proxy device 304 may determine how to route data traffic between the cloud service 303 and the client device 302. As such, when a proxy device 304 receives a connection advertisement 306 from a client device 302, the proxy device 304 can make such a determination for the particular requesting client device 302 and/or for that particular point in time. For example, a proxy device 304 may select a route for data transfer 312 between the cloud service 303 and the proxy device 304 at one point in time, but choose a different route at a later point in time based on one or more different factors. As such, the proxy device 304 may select a route based on a policy preference of the proxy device 304 and/or a network connection property of the proxy device 304 as noted. Based on the preference and/or connection property, the proxy device 304 may also determine whether to offer a proxy connection (e.g., to act as a host) to the client device 302 that provided the connection advertisement.

In some embodiments, a proxy device 304 may select a route based on a policy preference to avoid waking up an application processor on the proxy device. Such a preference may be established by a user in order to minimize battery usage on the proxy device 304. The proxy device 304 may include a first wireless communication circuit capable of communicating with the cloud service 303, and a second wireless communication circuit capable of communicating with both the client device 302 and the cloud service 303 where the application processor is communicatively coupled to the first wireless communication circuits. The second wireless communication circuit may include a proxy router for selecting a route (e.g., a path including a communications circuit) for transferring data between the cloud service 303 and the client device 302.

The route may be selected by weighting communication policy preferences of the proxy device 304, network connection properties the proxy device 304, and/or other factors associated with the potential connection between the client device 302 and the cloud service 303. For example, the proxy router of proxy device 304 may select the first or the second wireless communication circuit to use for communicating data between the cloud service 303 and the client device 302. The selection of a wireless communication circuit may be based on one or more policy preferences of the proxy device 304, and/or one or more network connection properties of the proxy device 304 with the cloud service 303. The proxy offer 308 may be a connection request indicating the selected route (e.g., indicating the selected wireless communication circuit).

Upon receipt of an advertisement from the client device 302, the proxy device 304 may determine a route for a proxy connection. As noted, this determination may be based on several factors including, but not limited to, network connection properties such as the RSSI, the quality and/or strength of the WAN connection of the proxy device 304, as well as other factors such as the battery and/or data usage budgets of the proxy device 304 or an account associated with a user of the proxy device 304. In some embodiments, certain factors may be weighted more than others and certain factors may act as sole determinants, essentially ending any further analysis. In some embodiments, each factor must be separately satisfied to provide a proxy offer; however, in other embodiments, one or more factors need not be satisfied. For example, the cellular connection (or WAN connection) of the proxy device 304 indicated in a connection property may act as a sole determinant in that if this connection is below a threshold level, the proxy device 304 may decide not to provide a proxy offer without considering any other factors. In this way, a sole determining factor may trump or otherwise outweigh all other factors of consideration. However, in other examples, each factor may be weighted evenly and considered together in making the determination of whether to provide a proxy offer. Thresholds for the noted factors may be based on industry standards, set by an administrator of the system, and/or configured by a user (e.g., the user of the client device 302 or the user of the proxy device 304) as desired.

At least in response to providing a connection advertisement 306, a client device 302 may receive a proxy offer 308 from the proxy device 304. A proxy device 304 may respond with a standard proxy offer 308 containing no payload. The client device 302 may then be able to determine whether to accept the proxy offer 308 and connect to the cloud service 303 via the proxy device 304. Proxy offers 308 may expire after a particular amount of time and that amount of time, along with a transmission time, may be included in the proxy offer 308. The proxy device 304 may select a route for data transfer 312 between client device 302 and the cloud service 303, where the route is selected based on a network connection property of the proxy device 304 at the transmission time.

Data transfer 310 may then take place between the client device 302 and the proxy device 304 via the LAN once the proxy offer 308 is accepted by the client device. For example, data of the client device 302 to be uploaded to the cloud service 303 or other WAN location via 404 is passed through application processor 452. Because application processor 452 will remain active while it is part of route 400, the processor will not be in a low power state. This will cause proxy device 404 to use more power than if an alternative route is used that bypasses processor 452.

III. Proxy Routing Via a Processor

A proxy device may include a processor, such as an application processor. Use of the processor for routing traffic to a client device may increase power consumption by the host device. When the proxy device is a mobile device that is not in a charging state, such power consumption can cause battery drain. Embodiments seek to minimize power consumption on a proxy device that is attributable to relaying traffic for a client device. This can be achieved by minimizing use of the processor for routing traffic. Such embodiments enable a user of a client device to avoid draining a proxy device's battery unnecessarily. This may be of particular interest when the user of the client device is different than another user associated with the proxy device.

Figure 4:
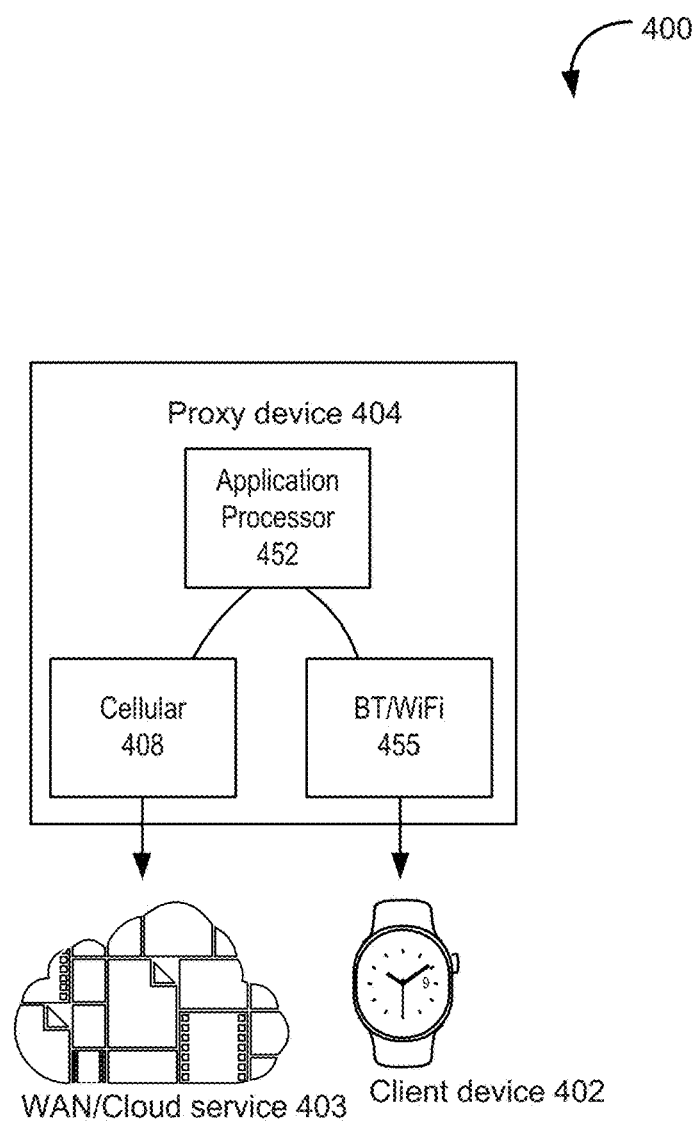
FIG. 4 is an example block diagram showing a route of proxy connection between a network and a client device via a processor of a proxy device that can be improved with embodiments.

FIG. 4 is an example block diagram showing a route of a proxy connection between cloud service 403 and a client device 402 via an application processor 452 of a proxy device 404. In the example of FIG. 4, route 400 includes application processor 452, which may prevent application processor 452 from entering a low power state. Route 400 is used, for example, when proxy device 404 is serving as a personal hotspot for client device 402.

Route 400 can be improved using the embodiments described herein. For example, embodiments select proxy routes that bypass application processor 452 so that power consumption by proxy device 404 is reduced. With routing 400, cellular communication circuit 408 is used for a backhaul connection between cloud service 403 and proxy device 404, and all traffic transferred between cloud service 403 and client device 402 is routed through application processor 452. For example, cellular communication circuit 408 is used for transferring data between the cloud service 403 and proxy device 404, Bluetooth™ (BT)/WiFi communication circuit 455 is used to transfer traffic between client device 402 and proxy device 404, and all data transferred between client device 402 and cloud service 403 via proxy device 404 is passed through application processor 452. Because application processor 452 will remain active while it is part of route 400, the processor will not be in a low power state. This will cause proxy device 404 to use more power than if an alternative route is used that bypasses processor 452.

IV. Router in Communications Circuit

Devices of various users can act as host devices. A host device can serve as a proxy device to provide a connection between client devices that do not have WAN functionality and a network (e.g., a WAN). In various embodiments, a proxy device can select a route for providing network access to a client device, and a client device can obtain network access via the route selected by the proxy device. In certain embodiments, the proxy device uses a proxy router within a communication circuit to select routes. Such embodiments allow the host device to serve as a proxy device without using its application processor or by reducing the usage of the application processor.

Figure 5:
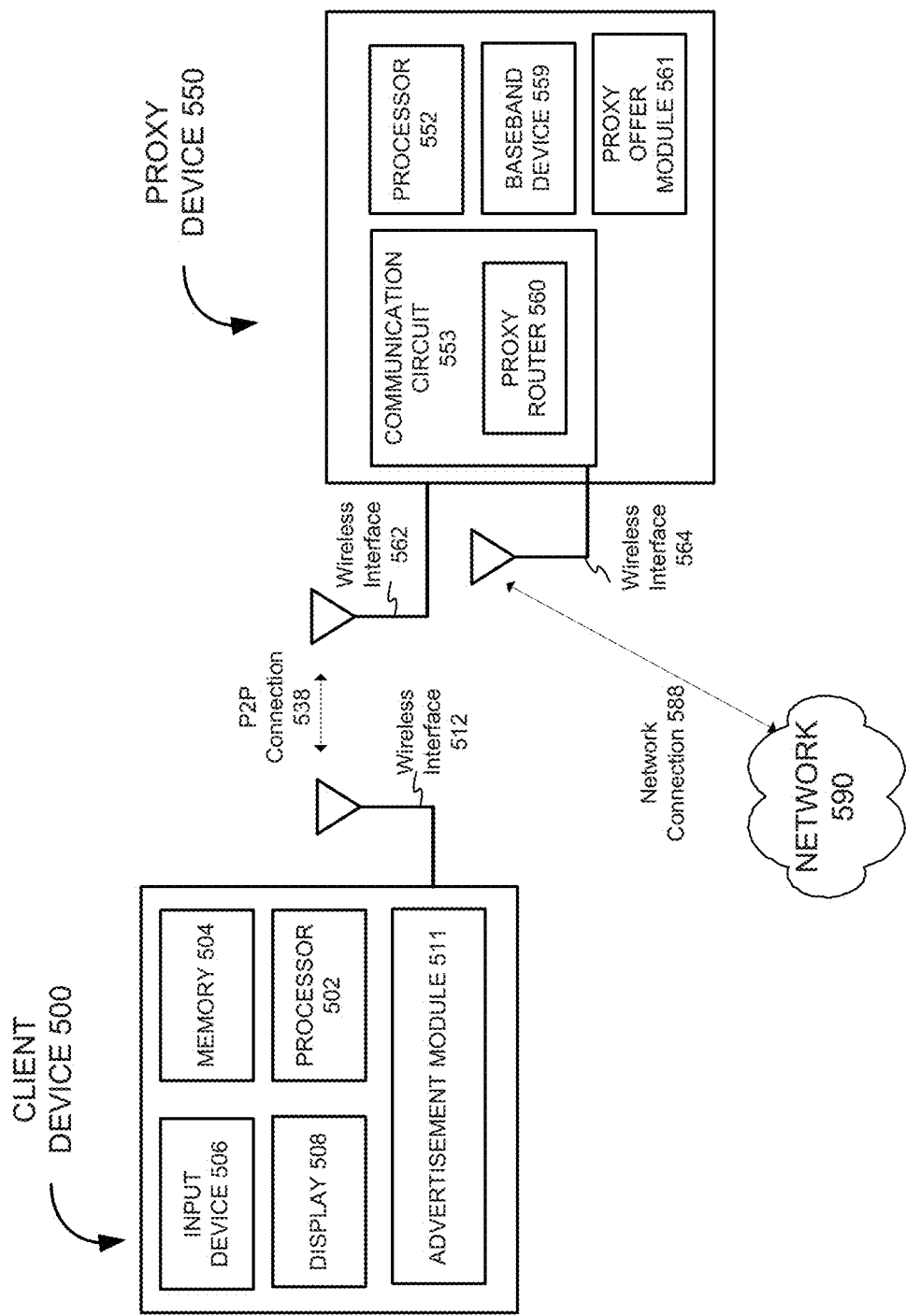
FIG. 5 is an example block diagram showing a client device, a proxy device with a proxy router, and network connections between the devices.

FIG. 5 illustrates a client device and a host device that may be used, e.g., in conjunction with or as part of systems 100 and 300 of FIGS. 1 and 3, to implement the routing of proxy connections. While two embodiments are illustrated by these figures, various implementations may include any number of client devices, host devices, and different networks that may be supported by the devices in a particular setup.

It should be apparent that the system shown in FIG. 5 illustrates one embodiment and that other similar embodiments can have more or fewer components than what is shown. Other embodiments may also include different configurations of the illustrated components, while remaining within the scope of the innovations herein.

FIG. 5 illustrates an embodiment with client device 500, proxy device 550, and network 590. Client device 500 may be any device accessible by a wireless interface, including a desktop computer, a laptop computer, a smartphone, a tablet computer, a wearable device (e.g., a network enabled watch, earpiece, or necklace) a networked appliance (e.g., a network enabled refrigerator or clothes washer,) media player, personal digital assistant, key fob, access card, multi-function device, game system, or any other such client device. Client device 500 comprises memory 504, processor 502, input device 506, display 508, and wireless interface 512. Client device 500 may also be configured with one more software modules for execution of particular functions, algorithms, and/or methods including, but not limited to, advertisement module 511. Proxy device 550 includes processor 552, wireless interface 562, wireless interface 564, and baseband device 559. Proxy device 550 may also include communication circuit 553 with a proxy router 560, and/or proxy offer module 561. The proxy router 560 of FIG. 5 may select one of various routes for data traffic. For example, the proxy router 560 may use one or more of a communication policy preference of the proxy device 550 and a network connection property of the proxy device 550 in order to determine a route to be used for data transferred via the proxy device 550. In some embodiments, the communication policy preference may be conveyed by processor 552 to the proxy router 560 at initialization of the proxy device 550.

In the non-limiting example of FIG. 5, communication circuit 553 may include WiFi/ Bluetooth™ (BT) circuitry (e.g., supporting either or both of Bluetooth™(BTLE) and Bluetooth™ (BT) classic) and cellular circuitry. In some embodiments, communication circuit 553 may be a combination WiFi/Bluetooth™ (BT) circuit including a WiFi radio and a Bluetooth™ (BT) radio. Communication circuit 553 may also include cellular circuitry and a cellular radio.

Proxy (host) device 550 may be any communication device capable of providing a proxy connection to a client device 500 in a fashion similar to what is described above for the routing of proxy connections between various client devices and a network such as network 590. Certain embodiments of host devices may have multiple communications interfaces, such that as part of data sharing performed by a host device, the host device communicates with a network using one communication interface based on a first communication protocol, and the host device communicates with a client device using a second communication interface different from the first communication interface and based on a second communication protocol different from the first communication protocol. Examples of such host devices may include smart phones, desktop computers, laptop computers, and other such network enabled computing devices. For example, proxy device 550 may communicate with network 590 using one communication interface, wireless interface 564, based on a first communication protocol supported by communication circuit 553. Also, for example, proxy device 550 may communicate with client device 500 using a second communication interface, wireless interface 562, different from the first communication interface and based on a second communication protocol different from the first communication protocol, where the second communication protocol is supported by communication circuit 553.

Client device 500 may communicate with proxy device 550 via connection 538. Similarly, proxy device 550 may communicate with network 590 via connection 588. In further embodiments, client device 500 may also create a connection with one or more other networks including network 590. Connection 538 in particular may, in certain embodiments, be implemented as a peer to peer (P2P) wireless connection directly between wireless interface 512 and wireless interface 562. In other embodiments, connection 538 may include multiple additional devices and sub-connections, including multiple access points, network routing connections, and communication servers.

Processors 502 and 552 may run various software components to perform various functions for devices 500 and 550 such as, but not limited to, modules 511 and 561. For example, processor 502 may run software components stored in memory 504 to perform various functions for client device 500. In some embodiments, the software components also include an operating system. In certain embodiments, processor 552 may be an application processor. In some examples, the advertisement module 511 may be configured to determine when to provide a connection advertisement as well as what to include in the advertisement.

As noted, the advertisement may include an indication of the type of connection requested by the client device 500 as well as other information. As shown in FIG. 5, communication circuit 553 of the proxy device 550 may include a proxy router 560 configured to select a route for use by the proxy device 550 to communicate data with network 590. The selection of a route through communication circuit 553 may be determined based at least on a communication policy preference of proxy device 550 and a network connection property of proxy device 550. The route may be selected in order to avoid waking up processor 552 in order to reduce power consumption by proxy device 550. That is, proxy router 560 may select a route so that processor 552 can remain in a low power state. According to embodiments, a communication policy preference of proxy device 550 may indicate a communication protocol preference, such as, for example, a preference to communicate using a WiFi, Bluetooth™(BT), or cellular data communications protocol. In some embodiments, a network connection property of the host device may indicate the presence of a network connection supporting a preferred communication protocol. Further, the proxy device 550 may include a proxy offer module 561. The proxy offer module 561 may be configured to determine whether to provide a proxy offer to a client device 500 (e.g., based on the factors described above).

The proxy device 550 may receive a connection advertisement provided by the client device 500 (e.g., via the connection 538). The proxy device 550 may then make a determination, using its proxy router 560. The route may be selected by weighting communication policy preferences of the proxy device 550, network connection properties the proxy device 550, and/or other factors associated with the potential connection between the client device 500 and network 590. For example, the proxy router 560 may select wireless communication circuit to use for communicating data between the network 590 and the client device 500. The selection of a wireless communication circuit may be based on one or more policy preferences of the proxy device 550, and/or one or more network connection properties of the proxy device 550 with network 590. The connection request sent to the client device 500 may indicate the selected route (e.g., including the selected wireless communication circuit).

A network connection property may be any property or combination of properties desired for availability and/or quality of a network connection that a proxy device 550 has. For example, a network connection property can indicate the presence of Internet connectivity and the quality of a connection that may be offered to a client device 500. A network connection property may measure the ability of the proxy device 550 with respect to factors associated with the proxy device 550 (e.g., external network congestion, number of other devices connected to the proxy device 550, data plan budget of the proxy device 550, battery levels of the proxy device 550, etc.) and/or factors such as LAN signal strength for a wireless LAN link between the proxy device 550 and the client device 500. A network connection property may reflect other properties as well, and it may be a percentage (e.g., 10%, 50%, etc.) or it may be a value out of another value (e.g., a ratio, such as 50/100, or 1/5). More specifically, a network connection property may be a value calculated by combining values associated with several properties or factors including, but not limited to, a received signal strength indication of the connection advertisement, WAN network congestion and/or connection quality (e.g., whether the cellular connection is 2G, 3G, LTE, or the like), data usage budgets of the proxy device 550, and/or battery budgets of the proxy device 550. Each network connection property may be weighted, in some examples, such that relative importance for each property may be considered. For example, if the presence of a relatively strong WiFi connection between the proxy device 550 and a WAN is the most important factor in determining a data route, the WiFi network connection property may be weighted the greatest.

In some embodiments, one or more network connection properties may be determined by the proxy device 550 after the proxy device 550 receives the connection advertisement from the client device 500. For example, a WiFi network connection property may be calculated for a specific timeframe associated with receipt of the connection advertisement. In this way, the WiFi network connection property may be an appropriate measure of proxy connection suitability for that specific timeframe. If too much time passes after the connection advertisement is received, the WiFi network connection property may no longer be valid. This is especially true when the location of the proxy device 550 changes over time and the strength and/or availability of a WiFi network connection may change accordingly.

As noted, other network connection properties, communication policy preferences, or values may also be utilized to determine a network connection property. For example, the proxy device 550 may be configured to identify the RSSI of the connection advertisement. Such a value may indicate the strength of incoming, and potentially future, transmission between the proxy device 550 and the client device 500 through the LAN. Additionally, the quality, strength, and/or congestion of the WAN may be a factor in determining a network connection property. For example, if the WAN connection of the proxy device 550 is poor, there would be little gained by routing a proxy connection via the proxy device 550 to a client device 500, even if the LAN connection between that client device 500 and the proxy device 550 were very strong. Other network connection properties may include data usage budgets of the proxy device 550. Network connection properties may be used in conjunction with one or more communication policy preferences to determine a data route. For example, a communication policy preference may indicate that a host device is not available to act as a proxy device when a battery level or charge is below a certain threshold. More specifically, if the battery charge of the proxy device 550 is low, the proxy router 560 may seek to avoid routing data via processor 552, because the proxy device 550 will use more power if processor 552 is not in a low power state. Similarly, if a service provider or cellular carrier that provides WAN data to the proxy device 550 limits the amount of the data that the proxy device 550 can send/receive, and/or if the user only pays for a certain amount of data outside of the provider's network (e.g., when the proxy device 550 is roaming), data usage budgets may be considered when determining a data route selected by proxy router 560. For example, if there is very little data allowance available for use by the proxy device 550 (e.g., based on limits, budgets, a roaming status, or the like), the proxy device 550 may not provide a proxy route based on a communication policy preference that considers such limits, budgets, or roaming status.

V. Routing Selection

Various methods can be performed by a proxy device to provide a WAN connection to a client device. Methods can be performed by the proxy device to select a route to be used by the client device to obtain and/or provide data to the WAN via the proxy device. The proxy device can have a communication circuit that includes a proxy router configured to select a route for transferring data between the WAN and the client device via the proxy device.

A. Proxy Route Selection

A proxy device such as the proxy device 550 of FIG. 5 may utilize network connection properties and communication policy preferences in various ways. For example, the proxy device 550 may determine whether a WiFi connection is available for communicating with network 590 (e.g., whether a WiFi linkage with the network 590 is available). Additionally, based on determining that a WiFi connection is available, the proxy device 550 may use a communication policy preference to determine whether a WiFi connection is preferred over a cellular connection. In response to determining that a WiFi connection is preferred, the proxy device 550 may establish network connection 588 as a WiFi connection and route traffic through communication circuit 553.

Figure 6:
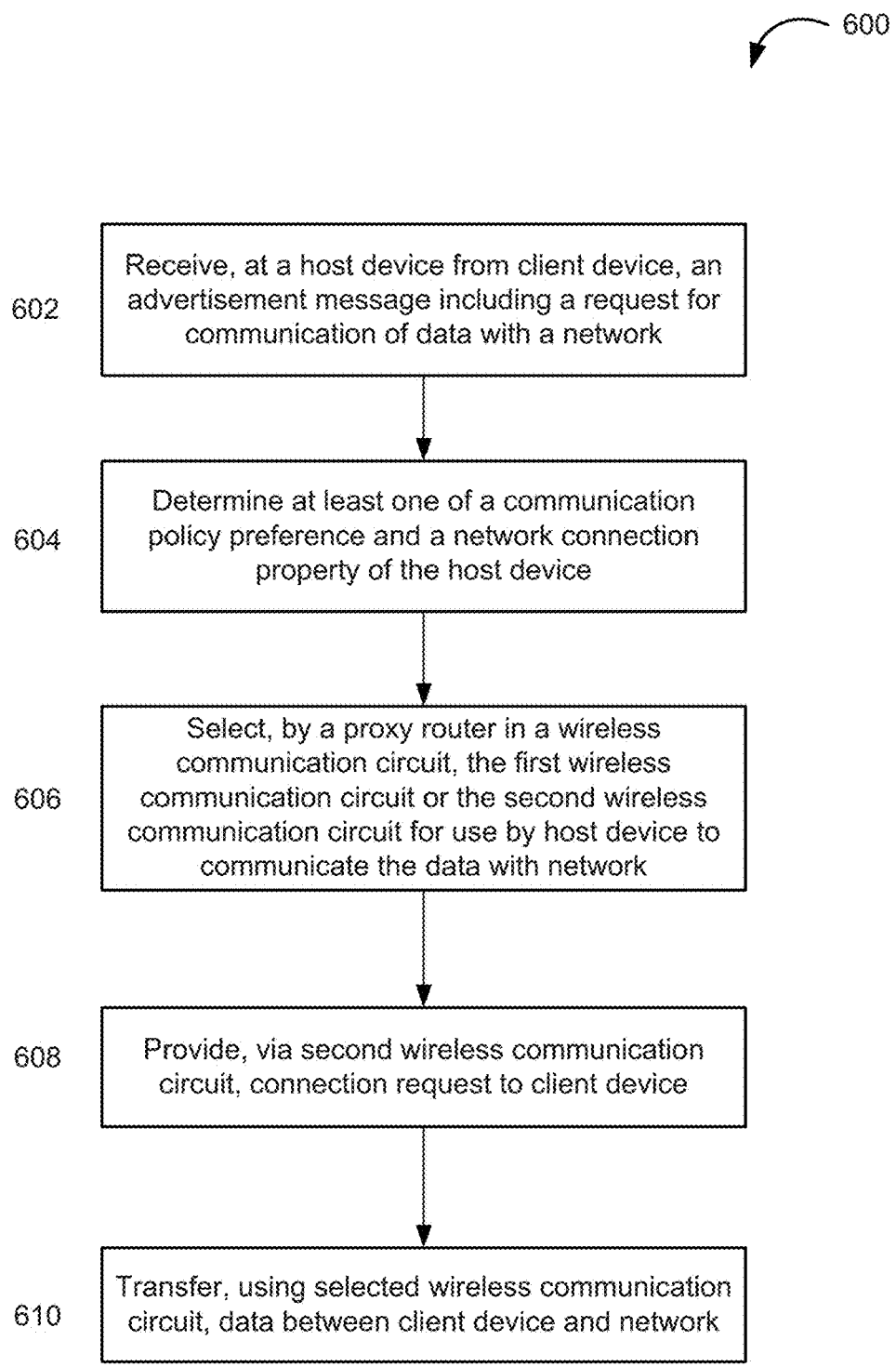
FIG. 6 is a flowchart of an example method of using a proxy router to determine a route of a proxy connection between a network and a client device.

FIG. 6 is a flowchart of an example method of determining a route for a proxy connection to a client device. The method 600 of FIG. 6 may be implemented by a proxy device (e.g., 550 of FIG. 5) by executing computer-executable instructions or the like stored thereon. The proxy device may be configured with a first wireless communication circuit for communicating with a first network (e.g., a LAN with the client device 500 of FIG. 5), a second wireless communication circuit for communicating with a second network (e.g., WAN, Internet, etc.), a memory, and a processor coupled to the memory, and/or to the wireless interfaces. The second wireless communication circuit may include a proxy router.

At 602, the host device (e.g., proxy device) may receive, from client device, an advertisement message including request for communication of data with a network. For example, the advertisement message may include a request to upload or download data from the Internet or the like. The advertisement message may also include a payload (e.g., the data to be uploaded) and/or other information about content to be communicated.

At 604, the host device may determine at least one of a communication policy preference of the host device and a network connection property of the host device. A network connection property may be determined in response to receipt of the advertisement message. In some embodiments, a network connection property may be based on transient and/or a current network connectivity as determined from connection properties of the host device with the network (e.g., Internet and/or cellular network connectivity levels). A network connection property may be calculated for a specific timeframe associated with receipt of the advertisement message. In this way, a network connection property may be an appropriate measure of network connectivity for that specific timeframe.

At 606, the proxy router may select the first wireless communication circuit or the second wireless communication circuit for use by host device to communicate the data with network. For example, the selection may be based on a communication policy preference of the host device or a network connection property of the host device.

At 608, the proxy device may provide a connection request to the client device via the second wireless communication circuit. The connection request may be made according to various protocols, and be the same protocol as the advertisement message. The connection request can include information about the host device, e.g., how routing is to be performed. The client device may use such information to determine whether to proceed with the connection.

At 610, the host device may transfer, using the selected wireless communication circuit, data between the client device and the network. The transfer may include transferring the data between the selected communication circuit and one or more wireless communication interfaces. For example, in the context of FIG. 5, the data transfer may include using wireless interfaces 562 and 564 to relay the data between network 590 and client device 500.

According to some embodiments, the transfer of the data may be managed by the proxy router so as to allow the host processor to remain in a low power state. In embodiments, the second wireless communication circuit comprises at least one of a Bluetooth™ (BT) radio and a WiFi radio, and the first wireless communication circuit comprises a cellular radio. According to certain embodiments, the Bluetooth™ (BT) radio or the WiFi radio are configured to report link metrics comprising at least one of: received signal strength indication metrics associated with the communication with the host device, signal-to-noise ratio metrics associated with the communication with the host device, and congestion control algorithm metrics associated with the communication with the host device. In one example, a connection property of the host device is based on at least one of the link metrics. According to some embodiments, the client device is associated with a first user and the host device is associated with a second user different from the first user. In certain embodiments, one or more network connection properties of the host device comprise at least one of: received signal strength indication metrics associated with the receipt of the advertisement message, signal-to-noise ratio metrics associated with the receipt of the advertisement message, and congestion control algorithm metrics associated with the receipt of the advertisement message.

B. Proxy Routing Via a Communication Interface to Another Communication Circuit

In some embodiments, a cellular communication circuit of a proxy device can be used to communicate with a WAN, and a separate Bluetooth™ (BT)/WiFi communication circuit is used to communicate with a client device. For example, if no WiFi connectivity to the WAN is available from the proxy device, the proxy device can use its cellular communication circuit to exchange data with the WAN, while continuing to use a Bluetooth™ (BT)/WiFi communication circuit to communicate with the client device.

Figure 7:
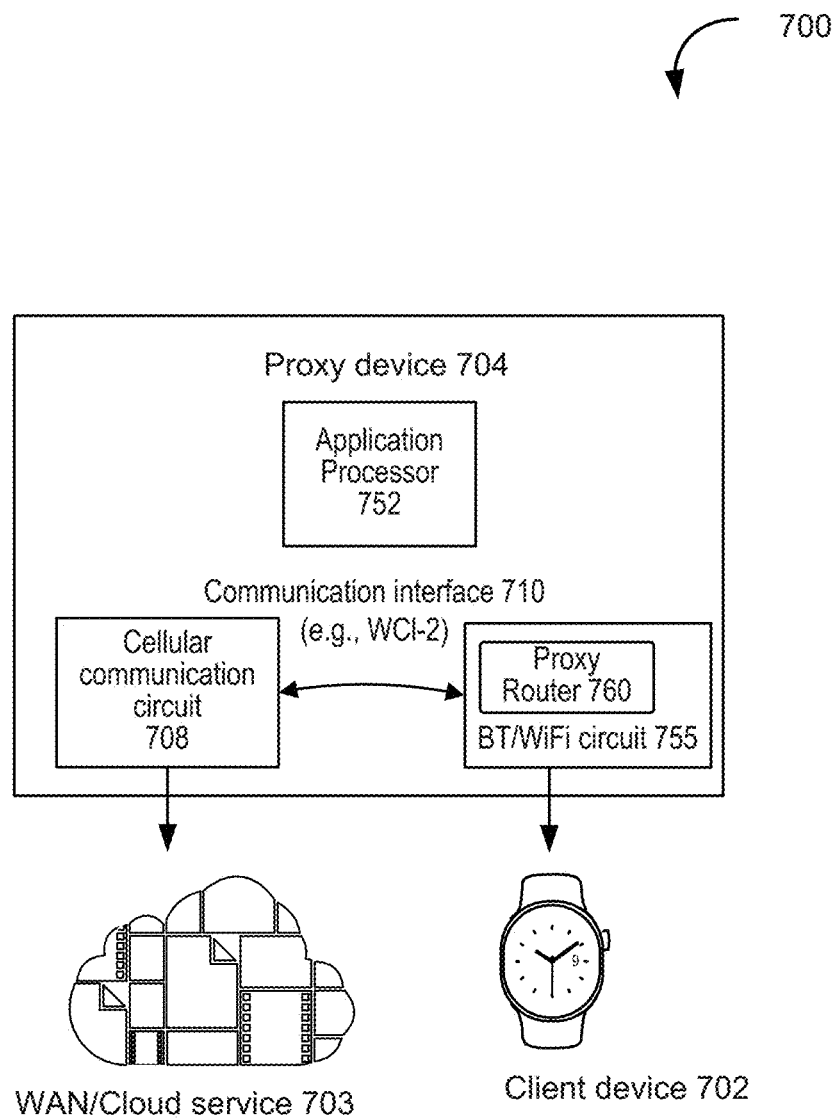
FIG. 7 is an example block diagram showing a route of proxy connection between a network and a client device via a communication interface of a proxy device.

FIG. 7 is an example block diagram showing a route 700 of a proxy connection between cloud service 703 and client device 702 via a communication interface 710 of proxy device 704. In the example of FIG. 7, traffic is routed over communication interface 710 between cellular communication circuit 708 and Bluetooth™ (BT)/WiFi communication circuit 755. In particular, the route 700 includes using cellular communication circuit 708 for a backhaul connection between cloud service 703 and proxy device 704 and communication interface 710 between cellular communication circuit 708 and Bluetooth™ (BT)/WiFi communication circuit 755. Communication interface 710 may be any interface that enables communications and messages to be passed between cellular communication circuit 708 and Bluetooth™ (BT)/WiFi communication circuit 755.

In some embodiments, communication interface 710 is a Wireless Coexistence Interface (WCI), such as, for example, the WCI-2 Bluetooth™ (BT) interface. In embodiments that use the WCI-2 interface, message types supported by the WCI-2 interface can be used to relay data between cellular communication circuit 708 and Bluetooth™ (BT)/WiFi communication circuit 755. For example, Type 2 messages may be used to send data back and forth between cellular communication circuit 708 and Bluetooth™ (BT)/WiFi communication circuit 755 when communication interface 710 is a WCI-2 interface. According to embodiments, any interface for communication of messages between cellular communication circuit 708 and Bluetooth™ (BT)/WiFi communication circuit 755 can be used as part of route 700.

With route 700, when data is to be downloaded to client device 702 from cloud service 703 (e.g., downlink), the data is retrieved from cloud service 703 using cellular communication circuit 708, which then relays the retrieved data to Bluetooth™ (BT)/WiFi communication circuit 755 using a message sent via communication interface 710. Bluetooth™ (BT)/WiFi communication circuit 755 then sends the relayed data to client device 702. Conversely, when data is to be uploaded from client device 702 to cloud service 703 (e.g., uplink), the data is sent from client device 702 to Bluetooth™ (BT)/WiFi communication circuit 755, which then relays the data to cellular communication circuit 708 via communication interface 710. Cellular communication circuit 708 then transmits the data to cloud service 703.

In route 700, communication interface 710 is used to transfer data via a connection that exists between cellular communication circuit 708 and Bluetooth™ (BT)/WiFi communication circuit 755. In this example, as data traffic is transferred from client device 702 via Bluetooth™ (BT)/WiFi communication circuit 755, that traffic is routed by Bluetooth™ (BT)/WiFi communication circuit 755 out to cloud service 703 without involving the application processor 752. This embodiment may allow application processor 752 to remain in or transition to a low power state while data is transferred via route 700. In this way, route 700 can reduce power consumption by application processor 752.

C. Proxy Routing within Same Communication Circuit

In some embodiments, a combination Bluetooth™ (BT)/WiFi communication circuit can be used to communicate directly with a WAN. For example, if a network connection property indicates that a WiFi connection to the WAN is available, and a communication policy preference indicates that WiFi communications are preferred over cellular communications, a proxy router may select a route that uses a Bluetooth™ (BT)/WiFi communication circuit to transfer data between the WAN and a client device.

Figure 8:
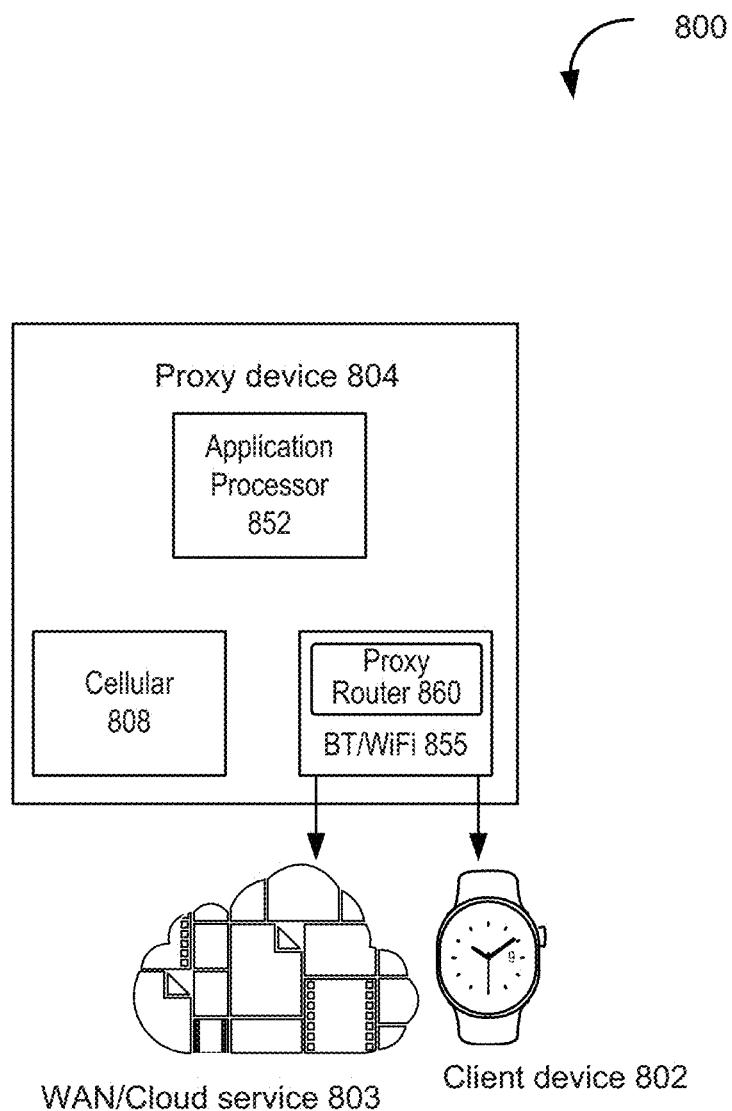
FIG. 8 is an example block diagram showing a route of proxy connection between a network and a client device via a communication circuit of a proxy device.

FIG. 8 is an example block diagram showing a route 800 of a proxy connection between cloud service 803 and client device 802 via proxy device 804. In the example of FIG. 8, data traffic stays within Bluetooth™ (BT)/WiFi communication circuit 855. In particular, the route 800 uses Bluetooth™ (BT)/WiFi communication circuit 855 for the backhaul connection between cloud service 803 and proxy device 804, as well as the connection between proxy device 804 and client device 802. With route 800, Bluetooth™ (BT)/WiFi communication circuit 855 is used for all data transfer. In this example, as data traffic is transferred from client device 802 via Bluetooth™ (BT)/WiFi communication circuit 855, that traffic is routed out through Bluetooth™ (BT)/WiFi communication circuit 855 without involving cellular communication circuit 808 or the application processor 852. In this way, route 800 can reduce power consumption by application processor 852 and cellular communication circuit 808.

In some embodiments, route 800 can be used when a Bluetooth™ (BT) (BTLE) connection is established between proxy device 804 and client device 802, and WiFi is used for a backhaul connection between cloud service 803 and proxy device 804. According to this embodiment, the data transfer can all be performed within Bluetooth™ (BT)/WiFi communication circuit 855 without having to wake up the application processor 852 or the cellular communication circuit 808. For example, with route 800, when data is to be uploaded from client device 802 to cloud service 803 (e.g., uplink), the data is sent from client device 802 to Bluetooth™ (BT)/WiFi communication circuit 855, which then relays the data to cloud service 803. Conversely, when data is to be downloaded from cloud service 803 to client device 802 (e.g., downlink), the data is retrieved from cloud service 803 to Bluetooth™ (BT)/WiFi communication circuit 855, which then transfers the retrieved data to client device 802.

D. Proxy Routing Based on Policy Preferences and Connection Properties

A proxy device may be able to determine one or more network connection properties. For example, the proxy device can determine that a WiFi connection to a WAN is available, that the proxy device has Internet connectivity via a cellular data network, and other network connection properties. The network connection properties may also include indications of the relative strengths of detected network connections. In some embodiments, one or more communication policy preferences can be conveyed to a proxy router by an application processor. For example, this conveyance can occur when the proxy device is initialized. The communication policy preferences can be used in conjunction with network connection properties to select a data route. For example, if a network connection property indicates that a WiFi connection to the WAN is available, and a communication policy preference indicates that WiFi communications are preferred over cellular communications, the proxy router of the proxy device may select a route that uses a Bluetooth™ (BT)/WiFi communication circuit to transfer data between the WAN and a client device.

Figure 9:
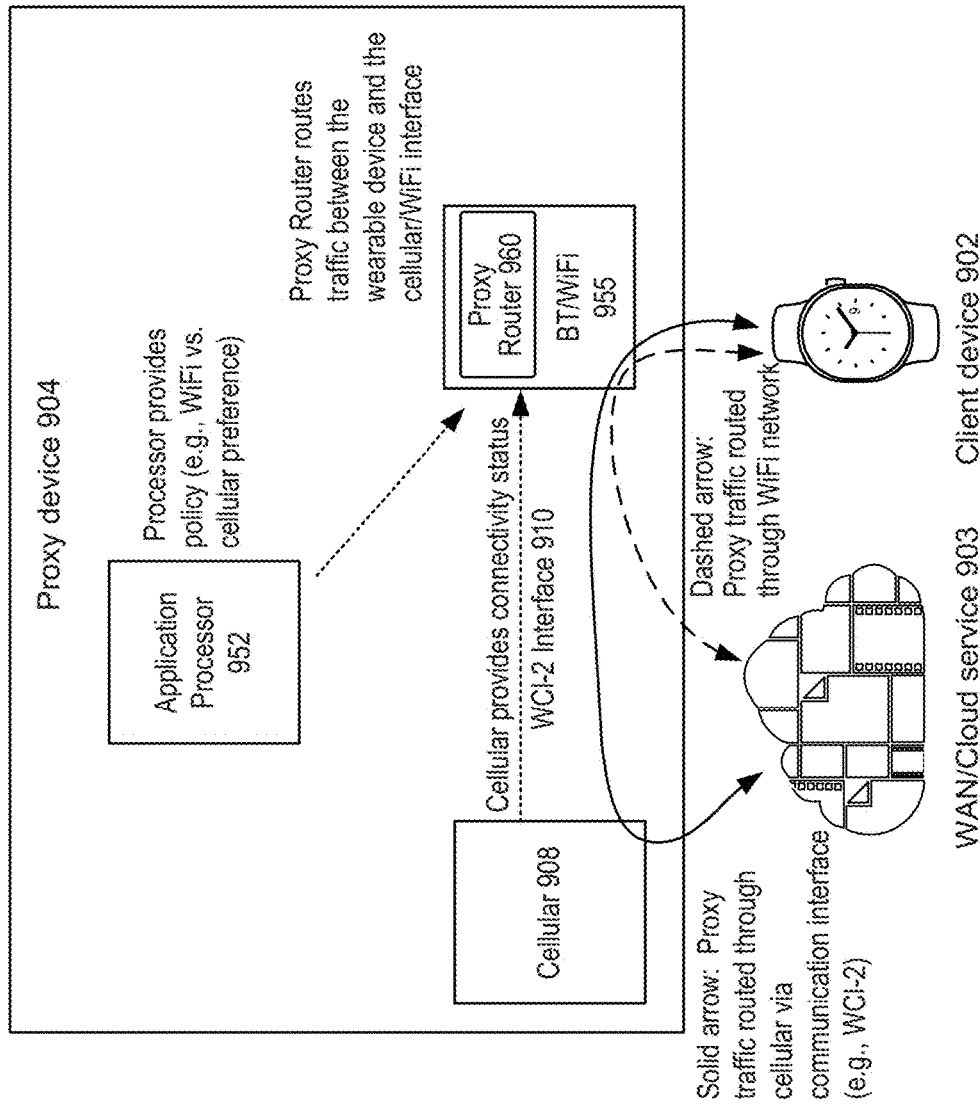
FIG. 9 is an example block diagram showing routes of proxy connections between a network and a client device via a proxy device.

FIG. 9 is an example block diagram showing routing of proxy connections between a network (e.g., WAN 903) and client device 902 via a proxy device 904. The routes may be selected by proxy router 960 based on one or more communication policy preferences and network connection properties. In the example of FIG. 9, the proxy router 960 functionality resides in the Bluetooth™ (BT)/WiFi communication circuit 955. In other embodiments, the proxy router functionality can reside in cellular communication circuitry 908 or be implemented in one or more other components. The application processor 952 may inform the proxy router 960 of one or more communication policy preferences, such as, for example a preference to use a WiFi versus a cellular data connection. In some embodiments, this information can be conveyed at initialization of the proxy device 904. The cellular communication circuit 908 may inform the proxy router 960 over a communication interface 910 (e.g., a WCI-2 interface) whether cellular connectivity to WAN 903 is available. A WiFi controller in Bluetooth™ (BT)/WiFi communication circuit 955 may inform proxy router 960 whether WiFi connectivity to WAN 903 is available. The availability (or lack thereof) of cellular and/or WiFi connectivity can be network connection properties of proxy device 904 used by proxy router 960 to select a route for data traffic between client device 902 and WAN 903. For example, communication with client device 902 over Bluetooth™ (BT)/Bluetooth™ low-energy (BTLE) or peer-to-peer WiFi can be carried out based on a route selected by proxy router 960, where the route selection is based on network connection properties. In particular, proxy router 960 may select cellular or WiFi for connectivity to WAN 903 based on current cellular or WiFi availability. Proxy router 960 can also select a route based on a cellular versus WiFi preference (e.g., WiFi preferred or cellular preferred) provided by application processor 952.

VI. Additional Embodiments

In some embodiments, a route may be selected by taking one or more of several factors into consideration, including the importance of the data to be communicated. For example, the data may be identified as important by the user (e.g., a message to another user on a priority list, a message flagged as urgent, data that is time sensitive, data that has been waiting to be transmitted for a long time, etc.) or it may be determined to be important based on the amount of time since the client device has been attempting to transmit it. The importance or priority of the data may be indicated in an advertisement message sent from a client device.

Figure 10:
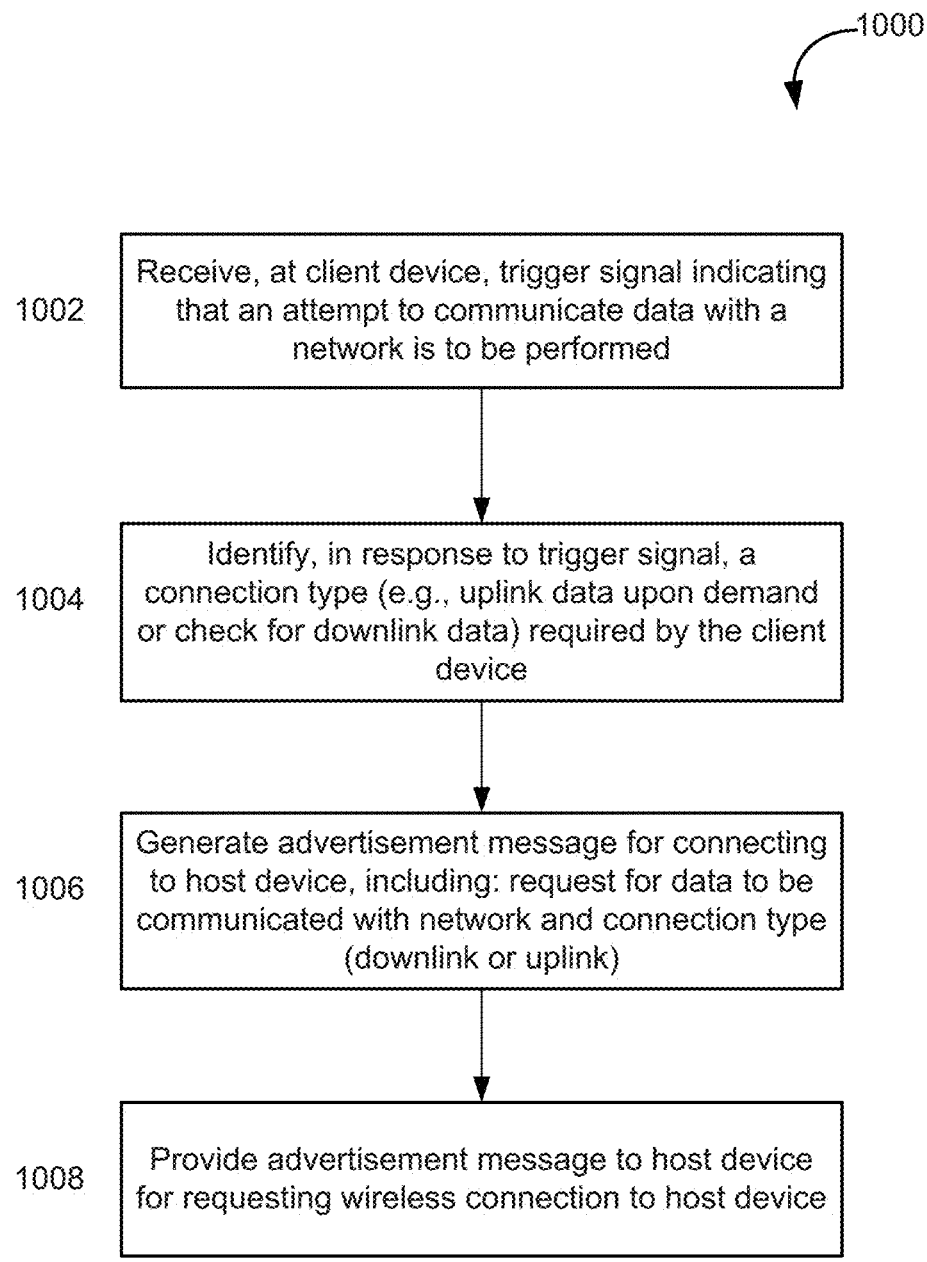
FIG. 10 is a flowchart of an example method of using a client device to indicate a requested connection type within an advertisement message requesting a connection to a network.

FIG. 10 is a flowchart of an example method of using a client device to request a connection to a network. In particular, FIG. 10 illustrates a method 1000 of using a client device to provide an indication of a requested connection type within an advertisement message requesting a connection to a network. The method 1000 of FIG. 10 may be implemented, e.g., by the client device 500 of FIG. 5 by executing computer-executable instructions or the like stored thereon. A client device may be configured with a wireless interface (e.g., wireless interface 512 of FIG. 5), a memory, and a processor (e.g., processor 552) coupled to the memory, and/or to the wireless interface 512.

At 1002, a client device may receive a trigger signal indicating that an attempt to communicate data with a network is being performed. In other words, the client device may determine the need to communicate data with a network (e.g., a WAN such as the Internet or the like). As various examples, the trigger signal may be based on a periodic check for content from the WAN, a periodic check to upload data through the WAN, a selection of data (e.g., by the user) to be uploaded or downloaded, the occurrence of an event (e.g., data capture) at the client, or the like. For example, the user may be attempting to send a message from the client device or may be attempting to download information from the Internet.

At 1004, the client device may identify, at least in response to the trigger signal, a connection type required by the client device. For example, as noted, the client device may identify whether it has data to be uploaded to a server through a WAN, or whether the client device is checking for data to be downloaded from a server through a WAN. The connection type may be identified by the client device as an uplink connection in anticipation of desiring to upload data. Conversely, the connection type may be identified by the client as a downlink connection in anticipation of desiring to check for data to be downloaded.

At 1006, once connection type is identified, the client device may be configured to generate an advertisement message for connecting to a host, such as proxy device 304 of FIG. 3. The advertisement message may include an indication of the requested connection type desired by the client device. The advertisement message may also include a request for the data to be communicated with the network (e.g., the WAN).

At 1008, the client device may transmit the advertisement message (e.g., via the wireless interface) to a host device for requesting a wireless connection to the host device. The advertisement message may include a data payload to be uploaded to the WAN. In various examples, the advertisement message may include a request for data to be downloaded to the client device and may, in some instances, also include a location at which the data may be located (e.g., a resource locator, an address, or the like) and/or an identifier of the data.

In some embodiments, the client device may be associated with a first user and the host device may be associated with a second user. In some cases, the first user and the second user may be different users. Further, in some examples, the client device may determine whether the first user is different from the second user (e.g., in response to the trigger signal), and may cancel the request for the wireless connection to the host device when the user is not different from the second user. In other words, if the potential host device is the user's own device (i.e., the same user associated with the client device), the client device may not need to perform one or more of the steps or all of the operations associated with steps 1002 or 1004, since the two devices may be configured to automatically communicate with one another (e.g., for providing Internet access to the client device).

Figure 11:
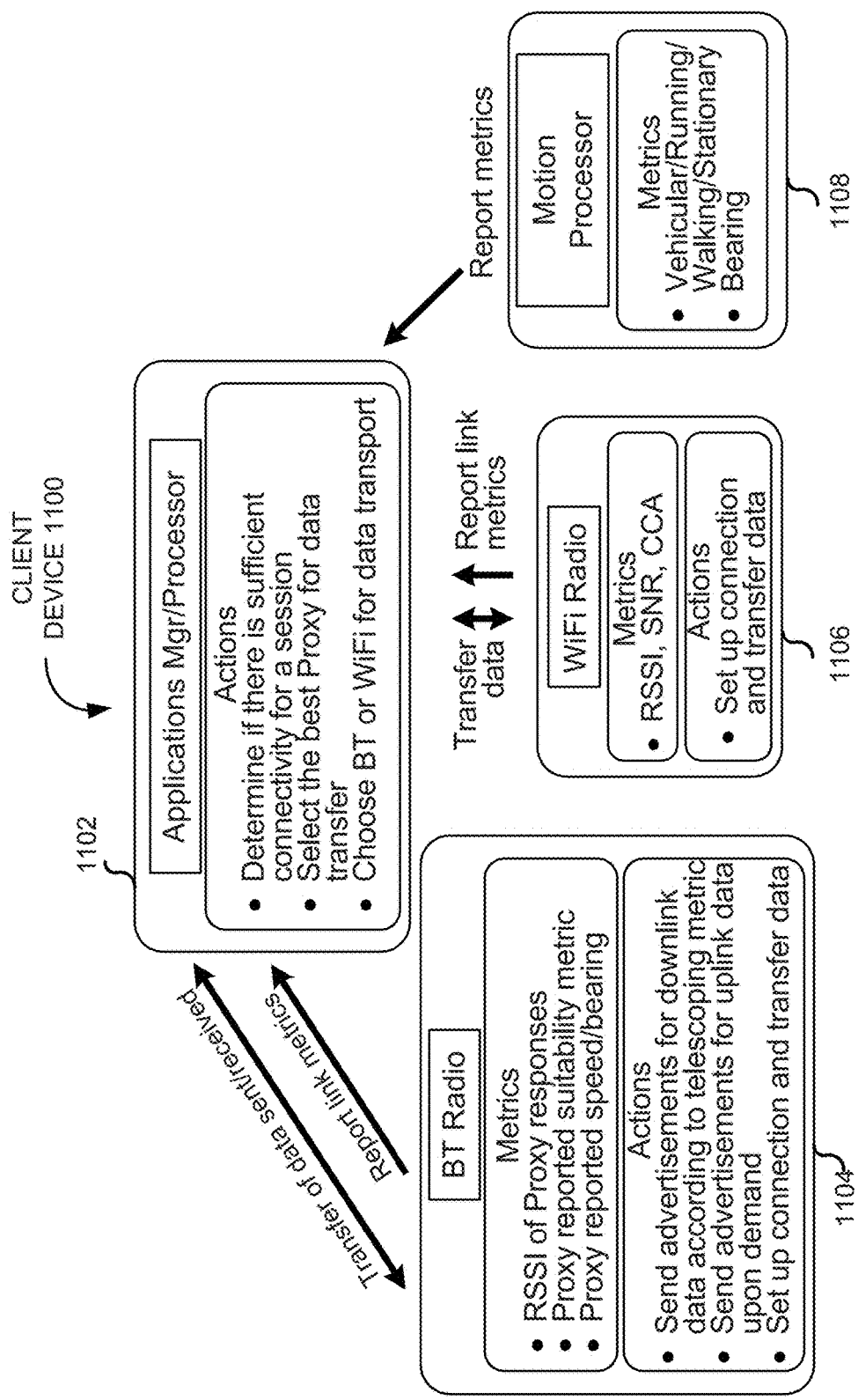
FIG. 11 is an example block diagram showing additional features of a client device.

FIG. 11 is a block diagram illustrating example embodiments of a client device 1100 capable of performing at least some of the features described at least with reference to the client devices of FIGS. 1-10. The client device 1100 may be configured to perform operations and/or embodiments described above with respect to method 1000 and/or method of FIG. 10. In some embodiments, the client device 1100 may be configured with an applications manager and/or applications processor 1102. Processor 1102 may be responsible for determining whether there is sufficient connectivity for a session (e.g., whether the client device 1100 will likely be able to connect to a proxy device). Processor 1102 may also select the best proxy device for data transfer when there are multiple proxy offers or connection requests received by the client device. Processor 1102 may also determine which radio access technology (RAT) to use for the data transport when a connection is established with a proxy device (e.g., whether to use Bluetooth™ (BT) or WiFi for the data transport).

Client device 1100 may also be equipped with both a Bluetooth™ (BT) radio 1104 (e.g., supporting either of both of Bluetooth™ (BT) classic and Bluetooth™ low energy (BTLE) and a WiFi radio 1106, as well as a motion processor 1108. Bluetooth™ (BT) radio 1104 or WiFi radio 1106 can be used to communicate with the proxy device. Bluetooth™ (BT) radio 1104 may track RSSI metrics associated with proxy responses, network connection properties reported by the proxy device, and/or a communication policy preference reported by the proxy device. These values and metrics may be reported to the processor 1102. Bluetooth™ (BT) radio 1104 may also send advertisements for downlink data according to a telescoping metric (e.g., to the proxy device), send advertisements for uplink data upon demand (e.g., to the proxy device), and/or set up connections for the transfer of data between the client device 1100 and the proxy device. WiFi radio 1106 may also track and report (e.g., to the processor 1102) RSSI metrics, and may also track and report SNR and/or CCA metrics. WiFi radio 1106 may also be configured to set up a connection between the client device 1100 and the proxy device and/or transfer data between the two. Motion processor 1108 may be configured to identify, detect, or otherwise determine vehicular, running, walking, stationary, etc., metrics as well as bearing/direction metrics associated with the client device 1100.

Figure 12:
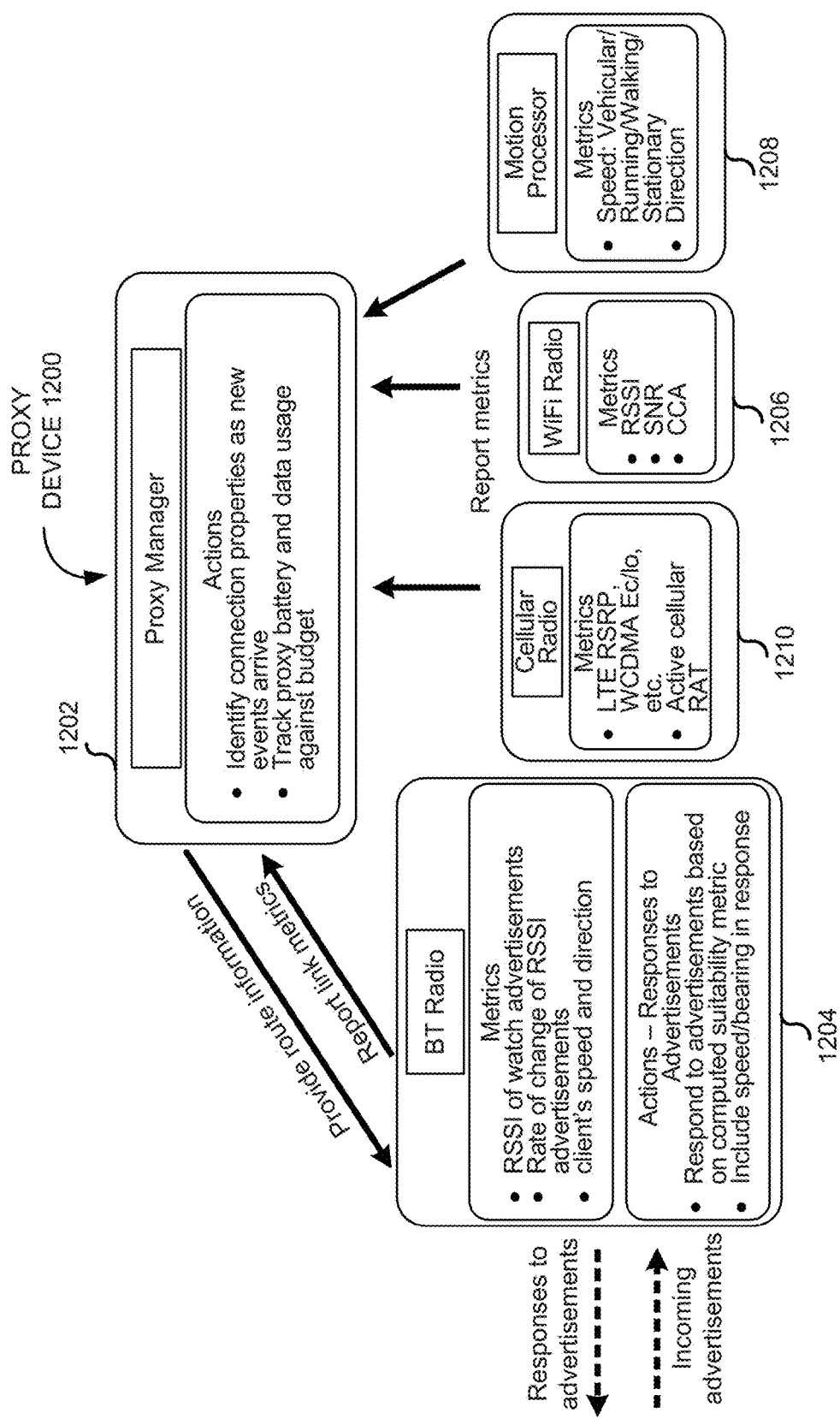
FIG. 12 is an example block diagram showing additional features of a proxy device.

FIG. 12 is a block diagram illustrating example embodiments of a proxy device 1200 capable of performing at least some of the features described at least with reference to the proxy devices of FIGS. 1-9. In some embodiments, the proxy device 1200 may be configured with a proxy manager 1202. Proxy manager 1202 may be responsible for determining a current network connection property (e.g., as new events arrive) and/or track proxy battery and/or data usage against the respective budget (e.g., based on an account with a service provider or the like). Proxy manager 1202 may also be responsible for selecting an appropriate RAT. In some embodiments, a response to an advertisement from a client device (e.g., the client device 1100 of FIG. 11 or any of the client devices described with respect to FIGS. 1-10) may be an offer to serve as a proxy (e.g., a proxy offer). As noted, a network connection property and/or a communication policy preference may be used by the proxy manager 1202 to determine a route the proxy device will use to communicate data with a network. In some embodiments, an initial communication between the client device and the proxy device 1200 may be via Bluetooth™ Low Energy (BTLE) or the like; however, the proxy manager 1202 may determine to switch RATs and utilize a different technology (or radio) for future communications. In other words, a Bluetooth™ (BT) radio 1204 may receive incoming advertisements from client devices, but the proxy device 1200 may respond with a proxy offer using a WiFi radio 1206. The proxy connection may then utilize the WiFi radio 1206 even though the initial communication was via Bluetooth™ Low Energy (BTLE). The opposite scenario, or alternative scenarios, may also be implemented as desired.

As noted, proxy device 1200 may be equipped with both a Bluetooth™ (BT) radio 1204 and a WiFi radio 1206, as well as a motion processor 1208 and a cellular radio 1210. In some embodiments, the radios may report changes in metrics as events to the proxy manager 1202. Bluetooth™ (BT) radio 1204 may track RSSI metrics associated with advertisements from a client device, rate of change of RSSI advertisements, and/or the speed and bearing of the client device. These metrics may be reported to the proxy manager 1202. Bluetooth™ (BT) radio 1204 may also select a route and respond to advertisements based on a network connection property of the proxy device 1200 and indicate a route to the client device (e.g., in proxy offers). WiFi radio 1206 may also track and report (e.g., to the proxy manager 1202) RSSI metrics, and may also track and report SNR and/or CCA metrics. Motion processor 1208 may be configured to identify, detect, or otherwise determine vehicular, running, walking, stationary, etc., metrics as well as bearing/direction metrics of the proxy device 1200. Further, cellular radio 1210 may track LTE, RSRP, WCDMA, etc. metrics as well as active cellular RAT metrics (e.g., for determining which cellular technology to use when multiple technologies are available).

According to one embodiment, radio devices 1204, 1210, 1206 of the proxy device 1200 may be configured to report link metrics such as, but not limited to, RSSI metrics, signal-to-noise ratio metrics, and/or congestion control algorithm metrics. In some examples, a network connection property of the proxy device 1200 may be based on one or more of the link metrics. The proxy device 1200 may be capable of updating one or more of its network connection properties based on the link metrics. For example, as a received signal strength indication increases for a particular communication link, a corresponding network connection property can be updated. The signal-to-noise ratio metrics may define an amount of signal strength associated with the communication with the proxy device 1200 with respect to noise detected during the communication with the host device. The proxy device 1200 may also be capable of updating a network connection property as the signal-to-noise ratio metrics increase. Further, the congestion control algorithm (CCA) metrics may define a calculated amount of congestion associated with the communication between a client device and the proxy device 1200, and the proxy device 1200 may be capable of updating a network connection property as the congestion control algorithm metrics increase.

VII. Devices

Figure 13:
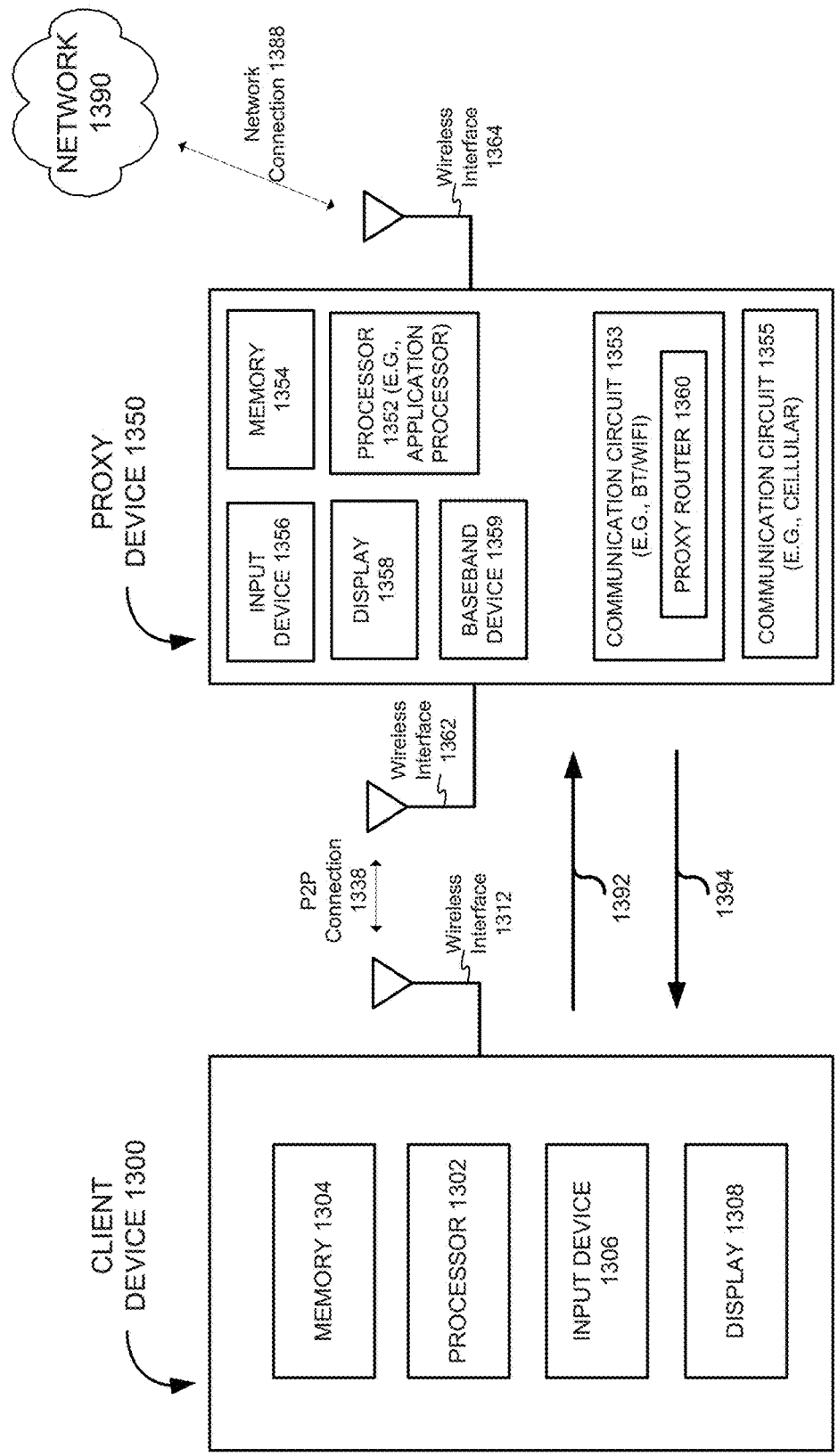
FIG. 13 is an example block diagram showing additional embodiments of a client device and a proxy device.

FIG. 13 illustrates additional example client devices and proxy (host) devices that may be used, e.g., in conjunction with or as part of systems 130, 300, or 500 of FIGS. 1, 3, and 5, respectively, to implement the management of proxy connections. While two embodiments are illustrated by these figures, various implementations may include any number of client devices, host devices, and different networks that may be supported by the devices in a particular setup.

It should be apparent that the systems shown in FIG. 13 illustrate several example embodiments, but that other similar embodiments can have more or fewer components than what is shown. Other embodiments may also include different configurations of the illustrated components, while remaining within the scope of the innovations herein.

FIG. 13 illustrates an embodiment with client device 1300, proxy (host) device 1350, and network 1390. Client device 1300 may be any device accessible by a wireless interface, including a desktop computer, a laptop computer, a smartphone, a tablet computer, a wearable device (e.g., a network enabled watch, earpiece, or necklace,) a networked appliance (e.g., a network enabled refrigerator or clothes washer,) media player, personal digital assistant, key fob, access card, multi-function device, game system, or any other such client device.

In some embodiments, once a client device 1300 or a proxy device 1350 decides to establish a proxy connection, the two devices attempt to upload and/or download the appropriate data as quickly and efficiently as possible. This is because there is a fairly large chance that the connection will terminate (end or be interrupted), sometimes before the transmission is complete, since the two devices may be moving and may not be moving together. For example, it may be possible for a user with a client device 1300 to be walking past a user with a proxy device 1350 and have the client device 1300 access the Internet through the proxy device 1350. If the users are walking slowly (e.g., in a crowded area, while waiting for public transit, at a park, or while one or both are waiting on a traffic light or crosswalk), the two devices may establish a connection and transmit data while the two users are in effective communication range of one another. In some embodiments, non-standard transfer protocols may be utilized by the two devices to enable a faster connection and data transfer.

In some embodiments, when the client device 1300 and/or proxy device 1350 calculate and/or provide their respective speeds, they may provide a classification or category of speed (e.g., slow, medium, fast, etc.) as opposed to a raw speed (e.g., feet per second or the like). As such, matching a speed and bearing may include relative matches, such that the two devices match within a category and do not necessarily have to match exactly.

Additionally, in some embodiments, a proxy device 1350 may receive multiple connection advertisements (also referred to as "advertisement messages" or "connection requests") from multiple client devices. However, the proxy device 1350 may simply respond to the first advertisement that it receives, either not aware that it will receive other advertisements or simply as an efficiency (e.g., it could be configured to always respond to the next advertisement received). In some cases, the proxy device 1350 may also track changes between advertisements. For example, based on a device ID or the like, the proxy device 1350 may be able to differentiate between advertisements from different client devices, identifying overall changes within the set of advertisements (e.g., from all client devices) and/or identifying changes within the advertisements from each particular client device 1300. As such, the proxy device 1350 may track that the RSSI or other information in the advertisement that indicates that the suitability of connecting with a particular client device 1300 may be improving. In some instances, even if the factors are not ideal (or are below the thresholds for providing a proxy offer), the proxy device 1350 may provide a proxy offer since it can infer that the conditions are improving and will eventually be good enough to offer a solid proxy connection. In some examples, the proxy device 1350 may behave as a router.

Client device 1300 may be any device accessible by a wireless interface, including a desktop computer, a laptop computer, a smartphone, a tablet computer, a wearable device (e.g., a network enabled watch, earpiece, or necklace,) a networked appliance (e.g., a network enabled refrigerator or clothes washer,) media player, personal digital assistant, key fob, access card, multi-function device, game system, or any other such client device. Client device 1300 comprises memory 1304, processor 1302, input device 1306, display 1308, and wireless interface 1312. Host device 1350 includes processor 1352, memory 1354, input device 1356, display 1358, wireless interface 1362, wireless interface 1364, and baseband device 1359.

Host device 1350 may be any communication device capable of providing data sharing to a client device 1300 in a fashion similar to what is described above for data sharing from various host devices to various client devices. Certain embodiments of host devices may have multiple communications interfaces, such that as part of data sharing performed by a host device, the host device communicates with a network using one communication interface based on a first communication protocol, and a the host device communicates with a client device using a second communication interface different from the first communication interface and based on a second communication protocol different from the first communication protocol. Examples of such host devices may include smart phones, desktop computers, laptop computers, and other such network enabled computing devices.

Client device 1300 may communicate with host device 1350 via connection 1338 (also referred to as the second network, where the first network is network connection 1388). Similarly, host device 1350 may communicate with network 1390 via connection 1388. In further embodiments, client device 1300 may also create a connection with one or more other networks including network 1390 (e.g., via a separate wireless interface and/or via the proxy connection 1338). In some examples, the connection 1338 (or at least the two wireless interfaces 1312, 1362) may be utilized for providing or otherwise communicating the advertisement message 1392 (e.g., from the client device 1300 to the proxy device 1350) and/or the proxy offer 1394 (e.g., from the proxy device 1350 to the client device 1300).

Different embodiments may implement connection 1338, connection 1388, or aspects of these connections using one or more communication protocols or technologies, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth™ (BT), Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A host or client device can include wireless circuitry as part of wireless interfaces, such as wireless interface 1312, wireless interface 1362, and wireless interface 1364, that can communicate over several different types of wireless networks depending on the range required for the communication. For example, a short-range wireless transceiver (e.g., Bluetooth™ (BT), a medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication.

Connection 1338 in particular may, in certain embodiments, be implemented as a peer to peer (P2P) wireless connection directly between wireless interface 1312 and wireless interface 1362. In other embodiments, connection 1338 may include multiple additional devices and subconnections, including multiple access points, network routing connections, and communication servers.

Wireless circuitry may be used in conjunction with wireless interfaces such as wireless interfaces 1312, 1362, and 1364 to send and receive information over wireless connections such as connection. Any device described herein may additionally include conventional circuitry such as an antenna system, an RF transceiver, one or more amplifiers, a tuner, one or more oscillators, a digital signal processor, a CODEC chipset, memory, etc. to enable various wireless connections as described herein.

Wireless circuitry may be coupled to processors such as processor 1302 and processor 1352 via peripherals interfaces. Voice and data information received by wireless circuitry may be sent to one or more processors via peripheral interfaces. One or more processors such as processors 1302 and 1352 may be configurable to process various data formats for one or more application programs stored on the memory of a device. As shown in FIG. 13, processor 1352 may be an application processor for proxy device 1350. Proxy device may also include communication circuits 1353 and 1355. In some embodiments, communication circuit 1353 is a Bluetooth™ (BT)/WiFi circuit with a proxy router, and communication circuit 1355 is a cellular circuit. In the non-limiting example of FIG. 13, communication circuit 1353 may be a combination WiFi/ Bluetooth™ (BT) circuit, and communication circuit 1355 may be a cellular circuit. According to this example, communication circuit 1353 may include one or more of a WiFi radio and a Bluetooth™ (BT) radio. Similarly, communication circuit 1355 may include a cellular radio.

Processors 1302 and 1352 may run various software components stored in respective memories 1304 and 1354 to perform various functions for devices 1300 and 1350. In some embodiments, the software components include an operating system, a communication module (or set of instructions), and other applications (or sets of instructions). In different embodiments, a processor may be a single integrated circuit, a set of multiple integrated circuits, or any logic hardware that may be used to implement processing functionality.

An operating system executed by a processor can be any suitable operating system. The operating system can include various procedures, sets of instructions, software components, and/or drivers for controlling and managing general system tasks (e.g., memory management, storage device control, power management, etc.) and facilitates communication between various hardware and software components.

Memory as described herein, including memory 1304 and memory 1354, may be any computer-readable medium and may further be any device or medium that can store code and/or data for use by one or more processors or device components. This may include a memory hierarchy, including cache, main memory, and secondary memory. The memory hierarchy can be implemented using any combination of RAM (e.g., SRAM, DRAM, SDRAM), ROM, FLASH, magnetic and/or optical storage devices, such as disk drives, magnetic tape, CDs (compact disks) and DVDs (digital video discs). In some embodiments, peripherals interfaces, one or more processors, and a memory controller can be implemented on a single chip within any device described herein. In some other embodiments, they can be implemented on separate chips.

Any device described herein such as host device 1350 and client device 1300 may also include power systems for powering the various hardware components. Power systems can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, host devices and/or client devices may include various sensors. A camera may be one example of a sensor. Such camera devices along with other sensors may be considered input devices as part of input device 1356. A camera may be used to create AV data for video calls or for pictures that may be communicated via data sharing provided by a host device. In some embodiments, devices may also include various other sensors. Sensors can include accelerometers, compass, gyrometer, pressure sensors, audio sensors, light sensors, barometers, microphones, and the like. Sensors can be used to implement various device decision making and filtering, such as blur compensation for a video image in a video call, or audio filtering to assist in filtering background noise from audio information captured at one or more microphones.

In some embodiments, a client device 1300 or a host device 1350 can include a Global Positioning System (GPS) receiver or other location assistance devices or modules. A device can use a satellite navigation system, such as the GPS, to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information. Other non-GPS location/motion modules may assist in determining the current position (e.g., coordinates or other geographic location identifier) and motion of a client device 1300 or host device 1350. In addition to GPS, cellular network positioning based on "cell IDs," and WiFi positioning technology based on a WiFi networks may be used for location assistance. In some embodiments, location/motion modules may use sensor information with the above systems to determine the current position of the host device. The location information may then be used to manage data sharing connections not only for a current host device that is sharing data, but for other host devices that may be used for data sharing based on movement of client devices.

Processor 1302 and processor 1352 may execute one or more applications on their respective devices, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc. The one or more applications can also include a specific application for managing data sharing communications.

There may be other modules or sets of instructions such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem including various input devices can be coupled to a display system such as display 1308 or display 1358. These displays may be touch-sensitive and may therefore operate as displays and input devices. A touch sensitive display of client device 1300 may thus operate both as input device 1306 and display 1308. A touch sensitive display of host 1350 may operate as display 1358 and input device 1356. The display may present visual output to the user as a graphic user interface (UI). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, an I/O subsystem can include a display and user input devices such as a keyboard, mouse, and/or trackpad as part of input device(s) 1306 or input device(s) 1356. In some embodiments, I/O subsystem can include a touch-sensitive display. A touch sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the input devices of a particular client device or host device can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, devices may include a touchpad separate from the screen for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present disclosure may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

In addition to client devices such as client devices 1300 and host devices such as host device 1350 detailed above, aspects of networks such as network 1390 and network connections such as network connection 1338 may also be implemented using various devices and device components. For example, while in certain embodiments connection 1338 may simply be a P2P wireless connection directly between wireless interface 1312 and wireless interface 1362, in other embodiments, a communications network may be used to implement connection 1338. Such a connection may include one or more access points, routers, server computers, storage devices, or other devices to implement network connection 1338. Each of these devices may include a processor, memory, and input/output structure as detailed above. Similarly, other network connections may involve cell towers, switching networks, packet processing devices, in addition to the server computers and other network infrastructure detailed above, each of which may include processing, memory, and network interface components.

Figure 14:
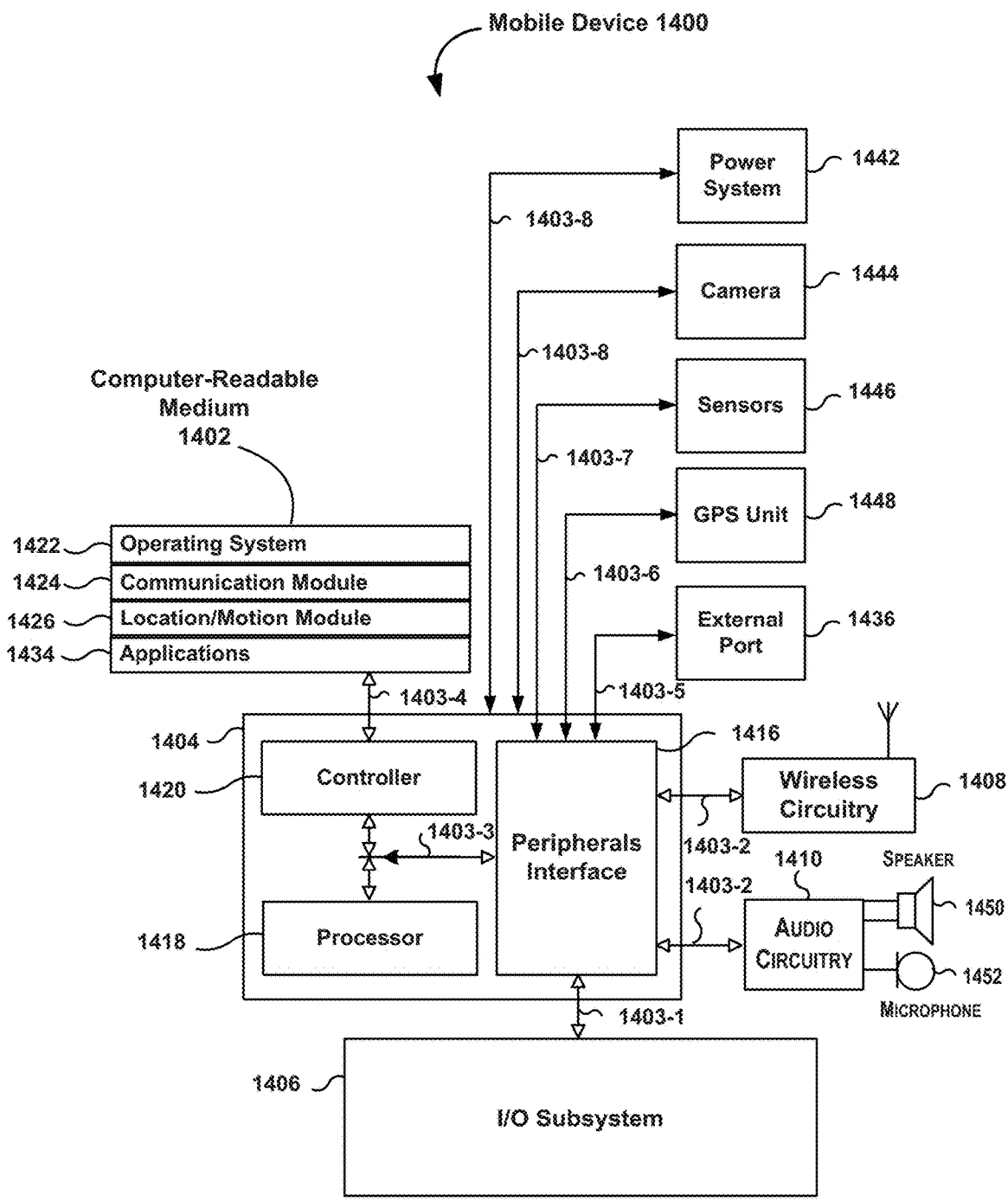
FIG. 14 is an example block diagram showing a device that may be a host device, a client device, or a server.

FIG. 14 is an example block diagram showing a device that may be a host device, a client device, or a server. Mobile device 1400 generally includes computer-readable medium 1402, a processing system 1404, an Input/Output (I/O) subsystem 1406, wireless circuitry 1408, and audio circuitry 1410 including speaker 1450 and microphone 1452. These components may be coupled by one or more communication buses or signal lines 1403. Device 1400 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items. In various embodiments, client device 500 or proxy device 550 or any other device, server, access point, network element or other computing device or element may be implemented in whole or in part using the elements of FIG. 14.

It should be apparent that the architecture shown in FIG. 14 is only one example of an architecture for mobile device 1400, and that device 1400 can have more or fewer components than shown, or a different configuration of components. The various components shown in FIG. 14 can be implemented in hardware, software, or a combination of both hardware and software, including one or more signal processing and/or application specific integrated circuits.

Wireless circuitry 1408 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 1408 is capable of establishing and maintaining communications with other devices using one or more communication protocols. A mobile device can include wireless circuitry that can communicate over several different types of wireless networks depending on the range required for the communication.

Wireless circuitry 1408 is coupled to processing system 1404 via peripherals interface 1416. Interface 1416 can include conventional components for establishing and maintaining communication between peripherals and processing system 1404. Voice and data information received by wireless circuitry 1408 (e.g., in speech recognition or voice command applications) is sent to one or more processors 1418 via peripherals interface 1416. One or more processors 1418 are configurable to process various data formats for one or more application programs 1434 stored on medium 1402.

Peripherals interface 1416 couple the input and output peripherals of the device to processor 1418 and computer-readable medium 1402. One or more processors 1418 communicate with computer-readable medium 1402 via a controller 1420. Computer-readable medium 1402 can be any device or medium that can store code and/or data for use by one or more processors 1418. Medium 1402 can include a memory hierarchy, including cache, main memory, and secondary memory. The memory hierarchy can be implemented using any combination of RAM (e.g., SRAM, DRAM, SDRAM), ROM, FLASH, magnetic and/or optical storage devices, such as disk drives, magnetic tape, CDs (compact disks) and DVDs (digital video discs). In some embodiments, peripherals interface 1416, one or more processors 1418, and memory controller 1420 can be implemented on a single chip, such as processing system 1404. In some other embodiments, they can be implemented on separate chips.

Mobile device 1400 also includes a power system 1442 for powering the various hardware components. Power system 1442 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 1400 includes a camera 1444. In some embodiments, mobile device 1400 includes sensors 1446. Sensors can include accelerometers, compasses, gyrometers, pressure sensors, audio sensors, light sensors, barometers, and the like. Sensors 1446 can be used to sense location aspects, such as auditory or light signatures of a location.

In some embodiments, mobile device 1400 can include a Global Positioning System (GPS) receiver, sometimes referred to as a GPS unit 1448. A mobile device can use a satellite navigation system, such as the GPS, to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1418 run various software components stored in medium 1402 to perform various functions for device 1400. In some embodiments, the software components include an operating system 1422, a communication module (or set of instructions) 1424, a location/motion module (or set of instructions) 1426, and other applications (or set of instructions) 1434, such as a car locator app and a navigation app. In some examples, the other applications 1434 may include applications that enable the functionality described above, namely the routing of proxy connections implemented by proxy router 1360, communication circuits 1353 and 1355, and/or wireless interfaces 1362 and 1364 of FIG. 13.

Operating system 1422 can be any suitable operating system, including iOS, Mac OS, Darwin, RTXC, LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1424 facilitates communication with other devices over one or more external ports 1436 or via wireless circuitry 1408 and includes various software components for handling data received from wireless circuitry 1408 and/or external port 1436. External port 1436 (e.g., USB, FireWire, Lightning connector, 60-pin connector, etc.) is adapted for coupling directly to other devices or indirectly over a network (e.g., the Internet, wireless LAN, etc.).

Location/motion module 1426 can assist in determining the current position (e.g., coordinates or other geographic location identifier) and motion (e.g., speed and bearing information) of mobile device 1400. Modern positioning systems include satellite based positioning systems, such as GPS, cellular network positioning based on "cell IDs," and WiFi positioning technology based on a WiFi networks. Typically, GPS is the most accurate, but often consumes more power than the other positioning systems. GPS also relies on the visibility of multiple satellites to determine a position estimate, which may not be visible (or have weak signals) indoors or in "urban canyons." In some embodiments, location/motion module 1426 receives data from GPS unit 1448 and analyzes the signals to determine the current position, speed, and/or bearing of the mobile device. In some embodiments, location/motion module 1426 can determine a current location, speed, and/or bearing using WiFi or cellular location technology. For example, the location, speed, and/or bearing of the mobile device can be estimated using knowledge of nearby cell sites and/or WiFi access points with knowledge also of their locations. Information identifying the WiFi or cellular transmitter is received at wireless circuitry 1408 and is passed to location/motion module 1426. In some embodiments, the location module receives the one or more transmitter IDs. In some embodiments, a sequence of transmitter IDs can be compared with a reference database (e.g., Cell ID database, WiFi reference database) that maps or correlates the transmitter IDs to position coordinates of corresponding transmitters, and computes estimated position coordinates for mobile device 1400 based at least in part on the position coordinates of the corresponding transmitters. Regardless of the specific location technology used, location/motion module 1426 receives information from which a location fix can be derived, interprets that information, and returns location information, such as geographic coordinates, latitude/longitude, or other location fix data.

The one or more applications 1434 on the mobile device can include any applications installed on the device 1400, including without limitation, a browser, address book, contact list, email, instant messaging, word processing, keyboard emulation, data routing, proxy connection managers, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

The I/O subsystem 1406 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1406 can include a display and user input devices such as a keyboard, mouse, and/or trackpad. In some embodiments, I/O subsystem 1406 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1402) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1400 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present disclosure may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Although the disclosure has been described with respect to specific embodiments, it will be appreciated that the disclosure is intended to cover all modifications and equivalents within the scope of the following claims.

What is claimed is:

1. A method of using a host device to connect a client device with a network device accessible to the host device, the method comprising:

at the host device comprising a first wireless communication circuit, a second wireless communication circuit that includes a proxy router, and a host processor communicatively coupled to the first wireless communication circuit and the second wireless communication circuit, wherein the host device is configured to communicate with the network device via a wide area network (WAN) using the first wireless communication circuit or via a local area network (LAN) using the second wireless communication circuit, and the first wireless communication circuit and the second wireless communication circuit are communicatively coupled with each other:

receiving, via the second wireless communication circuit, an advertisement message from the client device, the advertisement message including a request for communication of data with the network device;

identifying at least one of a communication policy preference of the host device or a network connection property of the host device;

determining, by the proxy router, and bypassing the host processor, which wireless communication circuit between the first wireless communication circuit and the second wireless communication circuit to use to communicate the data with the network device as requested by the client device, wherein the determining is based at least on the identified communication policy preference of the host device or the network connection property of the host device;

based on the determination, selecting, by the proxy router, and bypassing the host processor, a wireless communication circuit between the first wireless communication circuit and the second wireless communication circuit for use by the host device to communicate the data with the network device;

providing, via the second wireless communication circuit, a connection request to the client device; and transferring, via the selected wireless communication circuit of the host device, and bypassing the host processor, the data between the client device and the network device, wherein when the selected wireless communication circuit is the first wireless communication circuit, the data is transferred between the host device and the network device via the first wireless communication circuit, and between the host device and the client device via the second wireless communication circuit, with the data transferred between the first wireless communication circuit and the second wireless communication circuit;

wherein the host device comprises a mobile phone including a display, a user interface, and one or more applications installed on the mobile phone, wherein the host processor is configured to execute the one or more applications, and wherein the display is configured to present visual output associated with execution of the one or more applications.

2. The method of claim 1, wherein the communication policy preference of the host device indicates a communication protocol preference, and wherein the network connection property of the host device indicates a presence of a network connection supporting a communication protocol.

3. The method of claim 1, wherein the communication policy preference of the host device is provided to the proxy router by the host processor.

4. The method of claim 1, wherein the second wireless communication circuit comprises at least one of a Bluetooth™ (BT) radio and a WiFi radio, and wherein the first wireless communication circuit comprises a cellular radio.

5. The method of claim 4, wherein the Bluetooth™ (BT) radio or the WiFi radio is configured to report link metrics comprising at least one of:
received signal strength indication metrics associated with the communication with the host device,
signal-to-noise ratio metrics associated with the communication with the host device, or
congestion control algorithm metrics associated with the communication with the host device.

6. The method of claim 5, wherein the network connection property of the host device is based on at least one of the link metrics.

7. The method of claim 5, wherein the signal-to-noise ratio metrics define an amount of signal strength associated with the communication with the host device with respect to noise detected during the communication with the host device, and wherein the host device is capable of updating a connection property as the signal-to-noise ratio metrics increase.

8. The method of claim 5, wherein the congestion control algorithm metrics define a calculated amount of congestion associated with the communication with the host device, and wherein the host device is capable of updating a connection property as the congestion control algorithm metrics increase.

9. The method of claim 1, wherein the advertisement message indicates an importance of the data, and wherein the importance of the data is at least configured by a user of the client device or determined based on content of the data.

10. The method of claim 1, further comprising, at the host device, enabling a connection between the client device and the network device at least in response to an indication that the client device accepts the connection request.

11. The method of claim 1, wherein the network connection property of the host device comprises at least one selected from: received signal strength indication metrics associated with the receipt of the advertisement message, signal-to-noise ratio metrics associated with the receipt of the advertisement message, and congestion control algorithm metrics associated with the receipt of the advertisement message.

12. The method of claim 1, wherein the network connection property of the host device comprises a change in a received signal strength indicator metric from a first advertisement to a second advertisement received from the client device.

* * * * *